United States Patent
Honkanen et al.

(10) Patent No.: US 8,519,847 B2
(45) Date of Patent: Aug. 27, 2013

(54) METHODOLOGY, MODULE, TERMINAL, AND SYSTEM ENABLING SCHEDULED OPERATION OF A RADIO FREQUENCY IDENTIFICATION (RFID) SUBSYSTEM AND A WIRELESS COMMUNICATION SUBSYSTEM

(75) Inventors: Mauri Honkanen, Tampere (FI); Jari Junell, Espoo (FI); Antti Lappetelainen, Espoo (FI)

(73) Assignee: Nokia Corporation, Espoo (FI)

( * ) Notice: Subject to any disclaimer, the term of this patent is extended or adjusted under 35 U.S.C. 154(b) by 1144 days.

(21) Appl. No.: 12/094,867

(22) PCT Filed: Nov. 24, 2005

(86) PCT No.: PCT/IB2005/003547
§ 371 (c)(1),
(2), (4) Date: May 23, 2008

(87) PCT Pub. No.: WO2007/060494
PCT Pub. Date: May 31, 2007

(65) Prior Publication Data
US 2008/0309490 A1    Dec. 18, 2008

(51) Int. Cl.
*G08B 13/14*    (2006.01)
*G08B 1/00*    (2006.01)
*H04W 4/00*    (2009.01)

(52) U.S. Cl.
USPC ............ 340/572.1; 340/309.16; 340/3.2; 340/3.21; 455/422.1

(58) Field of Classification Search
USPC ................................... 340/572.1
See application file for complete search history.

(56) References Cited

U.S. PATENT DOCUMENTS

| | | | |
|---|---|---|---|
| 7,299,072 B2 * | 11/2007 | Ninomiya | 455/562.1 |
| 2002/0085689 A1 * | 7/2002 | Chin | 379/88.13 |
| 2003/0060206 A1 | 3/2003 | Sointula et al. | |
| 2004/0002305 A1 | 1/2004 | Byman-Kivivuori et al. | |

FOREIGN PATENT DOCUMENTS

| | | |
|---|---|---|
| EP | 0 865 172 A2 | 9/1998 |
| EP | 1 467 582 A1 | 10/2004 |
| EP | 1 499 070 A2 | 1/2005 |

OTHER PUBLICATIONS

PCT/US2005/003547 International Search Report, dated Jul. 14, 2006.
PCT/US2005/003547 Written Opinion, dated Jul. 14, 2006.

(Continued)

*Primary Examiner* — Donnie L Crosland
(74) *Attorney, Agent, or Firm* — Alston & Bird LLP

(57) ABSTRACT

A method for scheduling communications over a wireless communication subsystem and a radio frequency identification (RFID) communication subsystem comprising determining one or more periods of activity of the wireless communication subsystem; deriving one or more periods of non-activity on the basis of the one or more determined periods of activity; synchronizing an operation of the radio frequency identification (RFID) communication subsystem with the one or more periods of non-activity; and triggering the operation of the radio frequency identification (RFID) communication subsystem in accordance with the one or more derived periods of non-activity to enable substantially concurrent communications operation of the wireless communication subsystem and the radio frequency identification (RFID) communication subsystem.

45 Claims, 11 Drawing Sheets

(56) References Cited

OTHER PUBLICATIONS

Hale, William K., Frequency Assignment: Theory and Applications, *Proceedings of the IEEE*, vol. 68, No. 12, pp. 1497-1515, Dec. 1980.

Supplementary European Search Report for Application No. EP 05 80 8113 dated Oct. 5, 2012.

Office Action from Chinese Patent Appl. No. 200580051574.0, dated Nov. 25, 2010.

Office Action from related Chinese Patent Appl. No. 200580051574.0, dated Aug. 6, 2010.

* cited by examiner

State of the Art

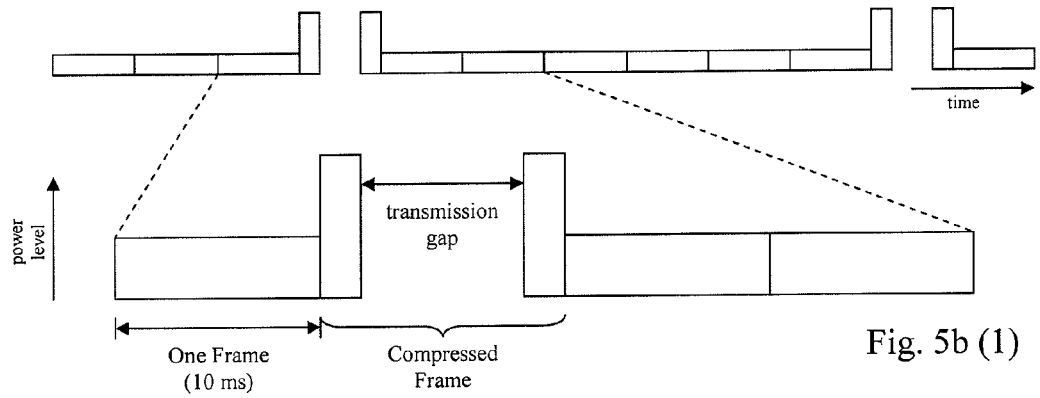
Fig. 5b (1)
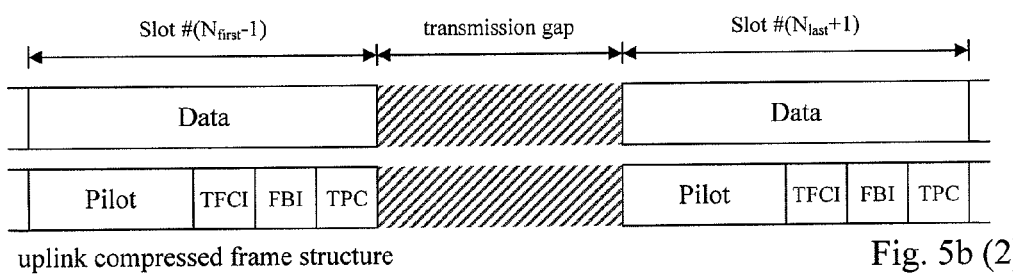
uplink compressed frame structure
Fig. 5b (2)
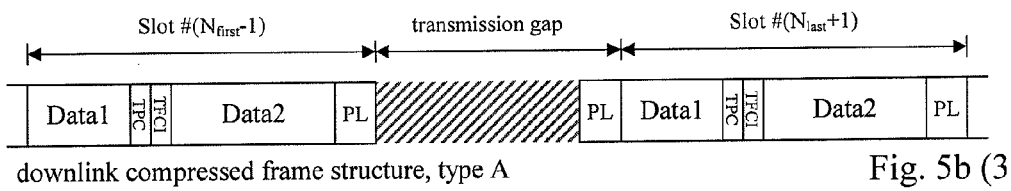
downlink compressed frame structure, type A
Fig. 5b (3)
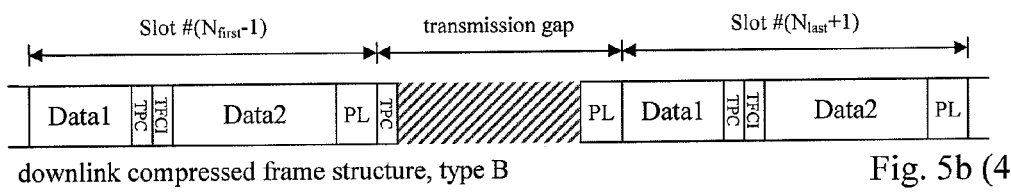
downlink compressed frame structure, type B
Fig. 5b (4)

METHODOLOGY, MODULE, TERMINAL, AND SYSTEM ENABLING SCHEDULED OPERATION OF A RADIO FREQUENCY IDENTIFICATION (RFID) SUBSYSTEM AND A WIRELESS COMMUNICATION SUBSYSTEM

The present invention relates to short-range communication systems. Particularly the present invention relates to quasi simultaneous operation of radio frequency identification (RFID) reader interface in cellular communication terminals. More particularly, the present invention relates to a time- and frequency-aligned operation of radio frequency identification (RFID) reader interface with respect to cellular communication.

Radio frequency identification (RFID) technology relates basically to the field of local communication technology and more particularly local communication technology involving electromagnetic and/or electrostatic coupling technology. Electromagnetic and/or electrostatic coupling is implemented in the radio frequency (RF) portion of the electromagnetic spectrum, using for example radio frequency identification (RFID) technology, which primarily includes radio frequency identification (RFID) transponders also denoted as radio frequency identification (RFID) tags and radio frequency identification (RFID) reader interfaces for radio frequency transponders also denoted for simplicity as radio frequency identification (RFID) readers.

In the near future, an increasing amount of different radio technologies will be integrated to mobile terminals. Expanding range of different applications drives need and requirement to provide radio access methodologies with different data rate, range, robustness, and performance specifically adapted to application environments and use cases, respectively. As a consequence to the multi-radio scenarios problems in interoperability of the multi-radio enabled mobile terminals will become a challenge in development.

Radio frequency identification (RFID) technology is one of the recent arrivals in the terminal integration radio frequency identification (RFID) communication enables new usage paradigms, e.g. pairing of devices, exchanging security keys, or obtaining product information by touching items provided with radio frequency identification (RFID) tags with radio frequency identification (RFID) communication enabled terminal. Typically, the operation range between the radio frequency identification (RFID) tag and radio frequency identification (RFID) reader interface in consumer applications is considered to be only a few centimeters.

Actually, there have already been product releases in radio frequency identification (RFID) readers integrated in mobile phones. Current implementations are based on Near Field Communications (NFC) technology that operates on 13.56 MHz. The communication in that technology is obtained by inductive coupling and therefore it requires rather large coil antennas both in the reader and tag. Furthermore, inductive coupling has its limitations when it comes to the range of the radio connection. Typically the maximum range at 13.56 MHz with reasonable excitation current and antenna sizes is about 1-2 m.

The limited range of radio frequency identification (RFID) systems at 13.56 MHz has increased the interest in supply chain management and logistics application arena towards higher frequencies, namely UHF (ultra high frequency) and microwave frequencies. At UH frequencies (around 868 MHz in Europe and 915 MHz in United States in accordance with the frequency allocation) the achievable range in industrial and professional fixed installations is up to ten meters, which allows completely new applications compared to 13.56 MHz. The operation of radio frequency identification (RFID) communication at UHF and microwave frequencies is based on backscattering, i.e. the reader (interrogator) generates an excitation/interrogation signal and the radio frequency identification (RFID) tag (RFID transponder) alters its antenna impedance according to a specified, data dependent pattern.

Currently, the most significant standardization forum at the UHF band is the EPCglobal that is leading the development of industry-driven standards for the Electronic Product Code (EPC) to support the use of Radio Frequency Identification (RFID) in today's fast-moving, information rich trading networks. The shorter-term target is to replace bar codes in pallets, and in long term also in packages and some individual products. If those targets come true, users will get product information or pointers to more detailed information to their radio frequency identification (RFID) communication enabled terminals just by touching an item, which is provided with an EPCglobal conforming radio frequency identification (RFID) transponder.

The excitation power generated in a radio frequency identification (RFID) reader subsystem is reasonably high, from about 100 mW of consumer applications related to mobile terminal to several watts used in professional fixed applications. The used frequency allocations for UHF radio frequency identification (RFID) band are the 868 MHz ISM band in Europe and the 915 MHz band in United States. Obviously, the used frequencies are close to the used cellular frequencies, which are 880 MHz-915 MHz as well as 925 MHz-960 MHz in Europe and 824 MHz-849 MHz as well as 869 MHz-894 MHz in United States for mobile station cellular transmitter and receiver, respectively. Due to the quite powerful radio frequency identification (RFID) excitation signal the radio frequency identification (RFID) reader subsystem emits, there can be severe interference caused to an operating cellular transceiver located in the same terminal due to the imperfect nature of the radio frequency identification (RFID) excitation signal and limited rejection of the RF filters. In practice, the radio frequency identification (RFID) reader antenna and the cellular antenna might be only a couple of centimeters spaced from each other, and thus the coupling loss might be something about 10-20 dB. Considering a RF power level of the radio frequency identification (RFID) reader subsystem of about 20 dBm (corresponding to about 100 mW), there might be a 0 dBm signal seen in the antenna port of the cellular transceiver. The cellular antenna and balun with their frequency dependency as well as the front end RF filter reject the interference in some extent, but the resulting signal level is still high enough to drastically interfere or in some situations even block the desired cellular signal. In an extreme case when a maximum integration benefit is searched for, the cellular radio and the radio frequency identification (RFID) reader might use the same antenna since operating frequencies of those systems are typically close to each other and hence one antenna could serve both systems.

It is an object of the present invention to provide a methodology and means to enable coordinated usage of both radio frequency identification (RFID) subsystem and wireless communication subsystem. In particular, the coexistence considered applies to a cellular communication subsystem and a radio frequency identification (RFID) subsystem integrated to the same terminal device. The radio frequency identification (RFID) subsystem causes interference by means of raised noised floor to any operating wireless communication subsystem in that mobile terminal.

The object of the present invention is solved by the features of the accompanying independent claims.

According to an aspect of the present invention, a method for scheduling communications over a wireless communication subsystem and a radio frequency identification (RFID) communication subsystem is provided. One or more periods of activity of the wireless communication subsystem are determined. On the basis of the one or more determined periods of activity, one or more periods of non-activity are derived. An operation of the radio frequency identification (RFID) communication subsystem is synchronized with the one or more periods of non-activity. Then, the operation of the radio frequency identification (RFID) communication subsystem is triggered in accordance with the one or more derived periods of non-activity such that substantially concurrent communications operation of the wireless communication subsystem and the radio frequency identification (RFID) communication subsystem is enabled.

According to another aspect of the present invention, a computer program product is provided, which enables Listen-Before-Talk measurement to allow identifying of one or more unoccupied RF sub-bands applicable for radio frequency identification (RFID) communication operable with a radio frequency identification (RFID) reader subsystem. The computer program product comprises program code sections for carrying out the steps of the method according to an aforementioned embodiment of the invention, when the program is run on a computer, a terminal, a network device, a mobile terminal, a mobile communication enabled terminal or an application specific integrated circuit. The computer program product comprising the code sections may be stored on a computer readably medium. Alternatively, an application specific integrated circuit (ASIC) may implement one or more instructions that are adapted to realize the aforementioned steps of the method of an aforementioned embodiment of the invention, i.e. equivalent with the aforementioned computer program product.

According to another aspect of the present invention, a scheduling module arranged for scheduling communications over a wireless communication subsystem and a radio frequency identification (RFID) communication subsystem is provided. The scheduling module is operable with the wireless communication subsystem and the radio frequency identification (RFID) communication subsystem and the scheduling module is arranged for determining one or more periods of activity of the wireless communication subsystem and deriving one or more periods of non-activity on the basis of the one or more determined periods of activity. The scheduling module is synchronized with the one or more periods of non-activity. A trigger signal is generated by the scheduling module and supplied to the radio frequency identification (RFID) communication subsystem to trigger an operation of the radio frequency identification (RFID) communication subsystem in accordance with the one or more derived periods of non-activity to enable substantially concurrent communications operation of the wireless communication subsystem and the radio frequency identification (RFID) communication subsystem.

According to another aspect of the present invention, a terminal device enabled for scheduled communications over a wireless communication subsystem and a radio frequency identification (RFID) communication subsystem of the terminal device is provided. The terminal device comprises a scheduling module operable with the wireless communication subsystem and the radio frequency identification (RFID) communication subsystem. The scheduling module is arranged for determining one or more periods of activity of the wireless communication subsystem and deriving one or more periods of non-activity on the basis of the one or more determined periods of activity. The scheduling module is synchronized with the one or more periods of non-activity. A trigger signal is generated by the scheduling module and supplied to the radio frequency identification (RFID) communication subsystem to trigger an operation of the radio frequency identification (RFID) communication subsystem in accordance with the one or more derived periods of non-activity to enable substantially concurrent communications operation of the wireless communication subsystem and the radio frequency identification (RFID) communication subsystem.

According to another aspect of the present invention, a system is provided, which enables scheduled communications over a cellular communication subsystem and a radio frequency identification (RFID) communication subsystem comprised by the system. The system further comprises a scheduling module operable with the cellular communication subsystem and the radio frequency identification (RFID) communication subsystem. The scheduling module is arranged for determining one or more periods of activity of the wireless communication subsystem and deriving one or more periods of non-activity on the basis of the one or more determined periods of activity. The scheduling module is synchronized with the one or more periods of non-activity. A trigger signal is generated by the scheduling module and supplied to the radio frequency identification (RFID) communication subsystem to trigger an operation of the radio frequency identification (RFID) communication subsystem in accordance with the one or more derived periods of non-activity to enable substantially concurrent communications operation of the wireless communication subsystem and the radio frequency identification (RFID) communication subsystem.

For a better understanding of the present invention and to understand how the same may be brought into effect reference will now be made, by way of illustration only, to the accompanying drawings, in which.

Figure 5A:
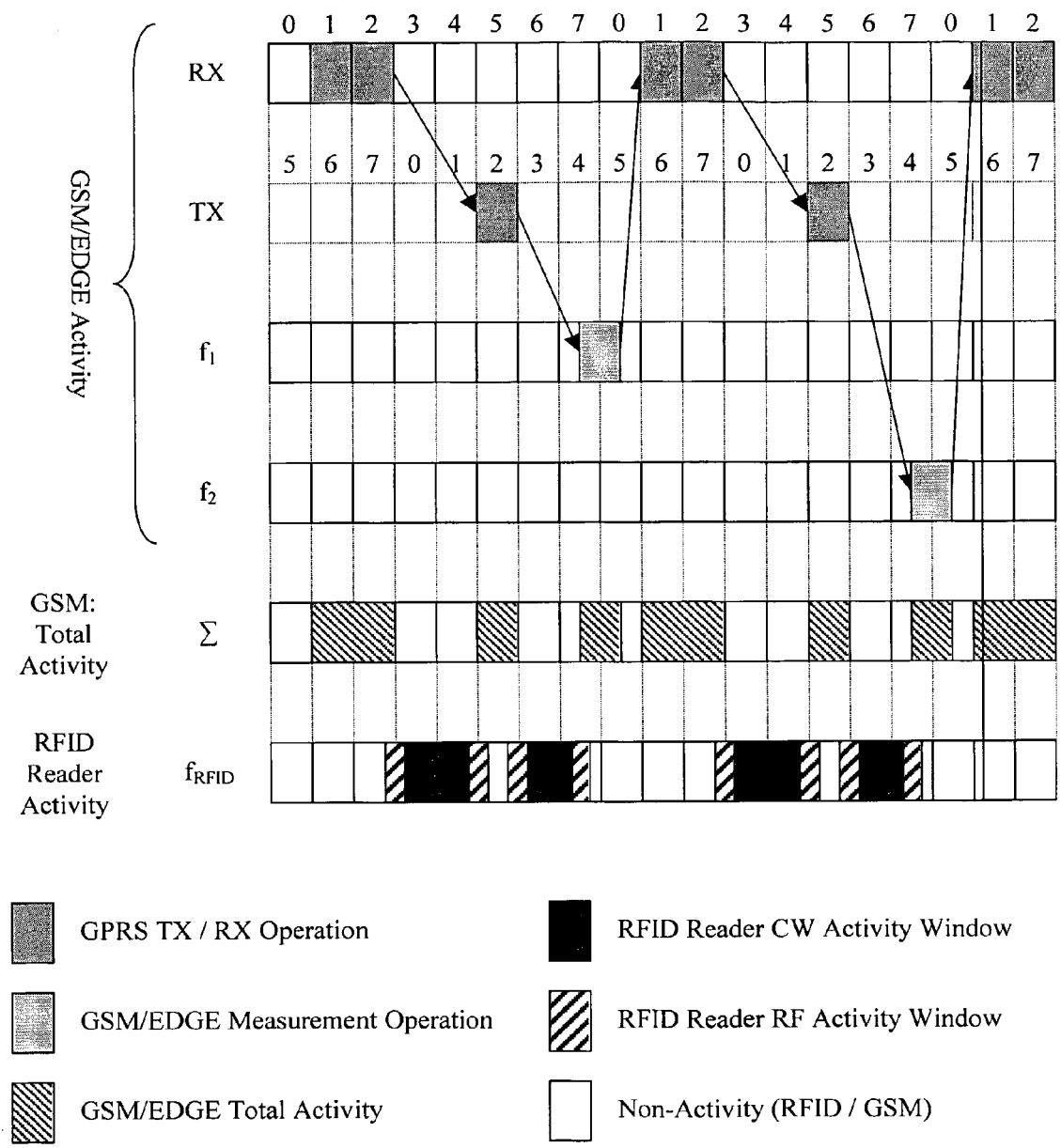
FIG. 5a illustrates schematically an exemplary GSM/EDGE activity timing diagram and radio frequency identification (RFID) communication activity timing diagram according to an embodiment of the present invention.
Figure 6A:
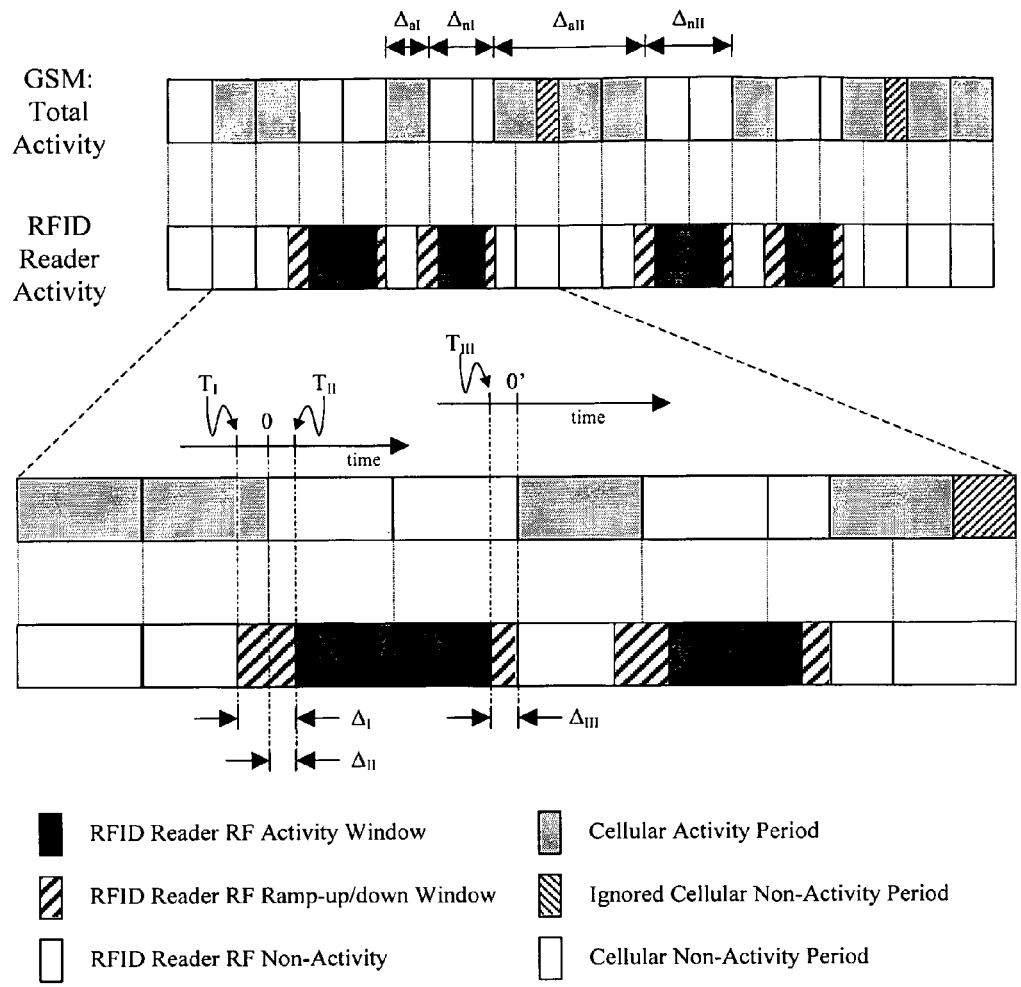
Figure 6B:
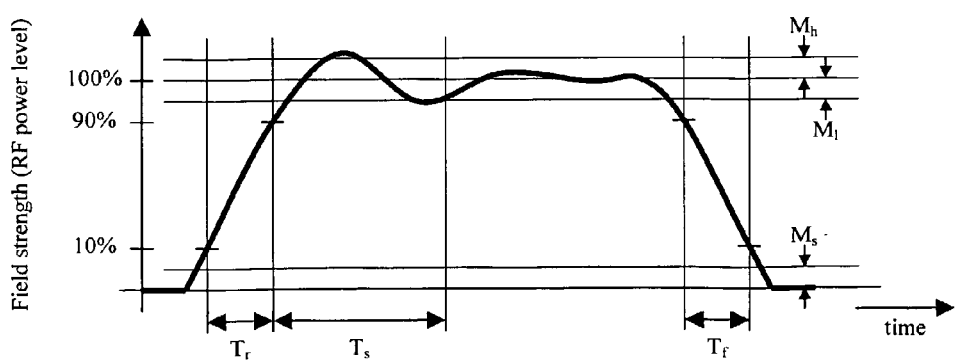
Figure 6C:
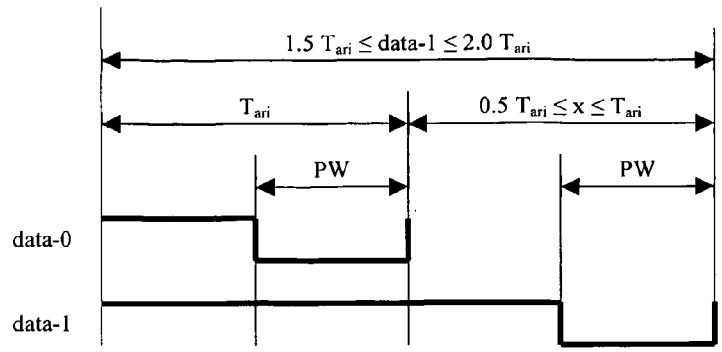
Figure 6D:
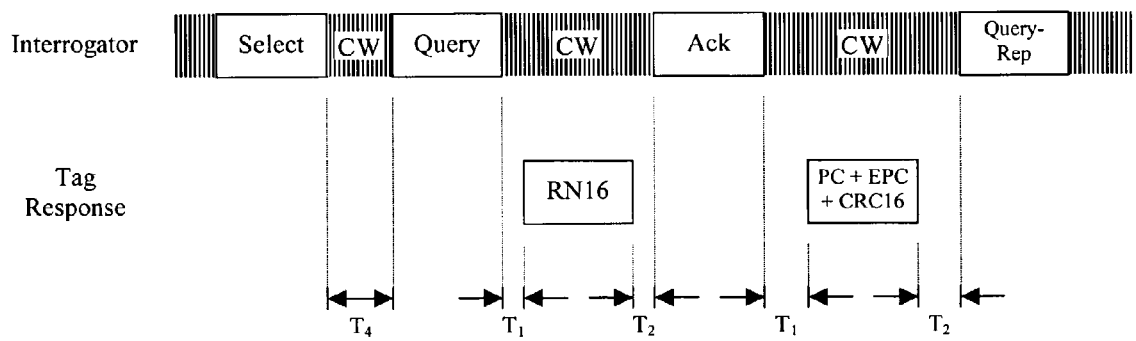
Figure 6E:
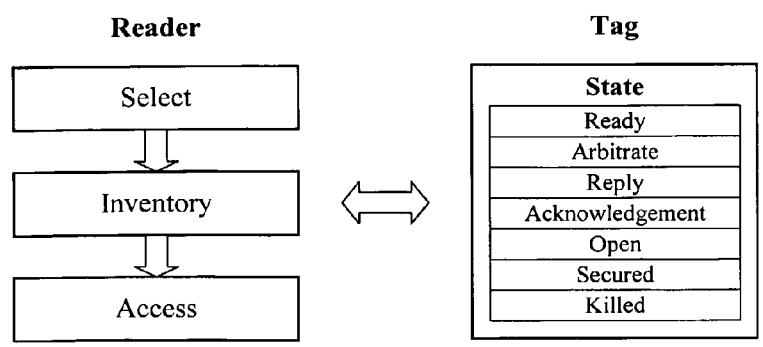

FIG. 5b (1)-(4) illustrate schematically an exemplary WCDMA compressed frame mode communication time diagram according to an embodiment of the present invention;

FIG. 6a illustrates more detailed the exemplary GSM/EDGE Activity timing diagram and radio frequency identification (RFID) communication activity timing diagram of FIG. 5a according to an embodiment of the present invention;

FIG. 6b illustrates schematically a power-up and power-down radio frequency envelope of a radio frequency identification (RFID) reader subsystem according to an embodiment of the present invention;

FIG. 6c illustrate schematically a pulse interval encoding of a data-0 and data-1 symbol used in radio frequency identification (RFID) communication according to an embodiment of the present invention;

FIG. 6d illustrate schematically link timing diagram of a radio frequency identification (RFID) communication between a radio frequency identification (RFID) reader subsystem and a radio frequency identification (RFID) transponder according to an embodiment of the present invention; and FIG. 6e illustrates schematically a sequence of radio frequency identification (RFID) communication processes and operation states of a radio frequency identification (RFID) transponder according to an embodiment of the present invention.

Throughout the description below, same and/or equal components will be referred by the same reference numerals.

In the following, the concept of the present invention will be described with reference to a cellular communication subsystem, which in particular supports GSM, GSM/GPRS, GSM/EDGE, cdma2000, and/or UMTS cellular communication. Moreover, the radio frequency identification (RFID) communication will be described with reference to Ultra-High Frequency (UHF) radio frequency identification (RFID) communication, which in particular supports EPCglobal standard. It should be noted that the aforementioned specifications of the cellular communication subsystem as well as the radio frequency identification (RFID) reader subsystem are given for the sake of illustration. The invention should be understood as not being limited thereto.

Originally, radio frequency identification (RFID) technology has been developed and introduced for electronic article surveillance, article management purposes, and logistics primarily for replacing bar code identification labels, which are used for article management purposes and logistics up to now. A typical implementation of a state of the art radio frequency identification (RFID) transponder is shown with respect to FIG. 1. A typical radio frequency identification (RFID) transponder module 10 includes conventionally an electronic circuit, depicted exemplary as transponder logic 12, with data storage capacity, depicted herein as transponder memory 13, and a radio frequency (RF) interface 11, which couples an antenna 14 to the transponder logic 12 The radio frequency identification (RFID) transponders are typically accommodated in small containers, particularly mounted to the item to be tagged by the means of adhesive. Depending on the requirements made on envisaged applications of the radio frequency identification (RFID) transponders (i.e. the data transmission rate, energy of the interrogation, transmission range etc.) different types are provided for data/information transmission at different radio frequencies within a range from several 10-100 kHz to some GHz (e.g. 134 kHz, 13.56 MHz, 860 MHz-928 MHz etc; only for illustration). Two main classes of radio frequency identification (RFID) transponders can be distinguished. Passive radio frequency identification (RFID) transponders are activated and energized by radio frequency identification (RFID) readers, which generate an excitation or interrogation signal, for example a radio frequency (RF) signal at a predefined frequency. Active radio frequency identification (RFID) transponders comprise their own power supplies (not shown) such as batteries or accumulators for energizing.

Upon activation of a radio frequency identification (RFID) transponder by the means of a radio frequency identification (RFID) reader module 20, the informational contents stored in the transponder memory 13 are modulated onto a radio frequency (RF) signal (i.e. the interrogation RF signal), which is emitted by the antenna 14 of the radio frequency identification (RFID) transponder module 10 to be detected and received by the radio frequency identification (RFID) reader module 20. More particularly, in the case of a passive radio frequency identification (RFID) transponder (i.e., having no local power source), the radio frequency identification (RFID) transponder is conventionally energized by a time-varying electromagnetic radio frequency (RF) signal/wave generated by the interrogating radio frequency identification (RFID) reader. When the radio frequency (RF) field passes through the antenna associated with the radio frequency identification (RFID) transponder 10, a voltage is generated across the antenna. This voltage is used to energize the radio frequency identification (RFID) transponder 10, and enables back transmission of information from the radio frequency identification (RFID) transponder to the radio frequency identification (RFID) reader, which is sometimes referred to as back-scattering.

Typical state of the art radio frequency identification (RFID) transponders correspond to radio frequency identification (RFID) standards such as the ISO 14443 type A standard, the Mifare standard, Near Field Communication (NFC) standard, and/or the EPCglobal standard.

In accordance with the application purpose of a radio frequency identification (RFID) transponder, the information or data stored in the transponder memory 13 may be either hard-coded or soft-coded. Hard-coded means that the information or data stored in the transponder memory 13 is predetermined and unmodifiable. Soft-coded means that the information or data stored in the transponder memory 13 is configurable by an external entity. The configuration of the transponder memory 13 may be performed by a radio frequency (RF) signal received via the antenna 14 or may be performed via a configuration interface (not shown), which allows access to the transponder memory 13.

A radio frequency identification (RFID) reader module 20 typically comprises a RF interface 21, a reader logic 22, and a data interface 23. The data interface 23 is conventionally connected with a host system such as a portable terminal, which, inter alia, on the one hand exercises control over the operation of the radio frequency identification (RFID) reader 20 by the means of instructions transmitted from the host to the reader logic 22 via the data interface 23 and on the other hand receives data provided by the reader logic 22 via the data interface 23. Upon instruction to operate, the reader logic 22 initiates the RF interface 21 to generate the excitation/interrogation signal to be emitted via the antenna 24 coupled to the RF interface 21 of the radio frequency identification (RFID) reader module 20. In case that a radio frequency identification (RFID) transponder such as a radio frequency identification (RFID) transponder module 10 is within the coverage area of the excitation/interrogation signal, the radio frequency identification (RFID) transponder is energized and a modulated RF signal (back-scatter RF signal) is received therefrom. Particularly, the modulated RF signal carries the data stored in the transponder memory 13 modulated onto the excitation/interrogation RF signal. The modulated RF signal is coupled into the antenna 24, demodulated by the RF interface 21, and supplied to the reader logic 22, which is then responsible to obtain the data from the demodulated signal. Finally the data obtained from the received modulated RF signal is provided via the data interface to the host system.

Figure 2A:
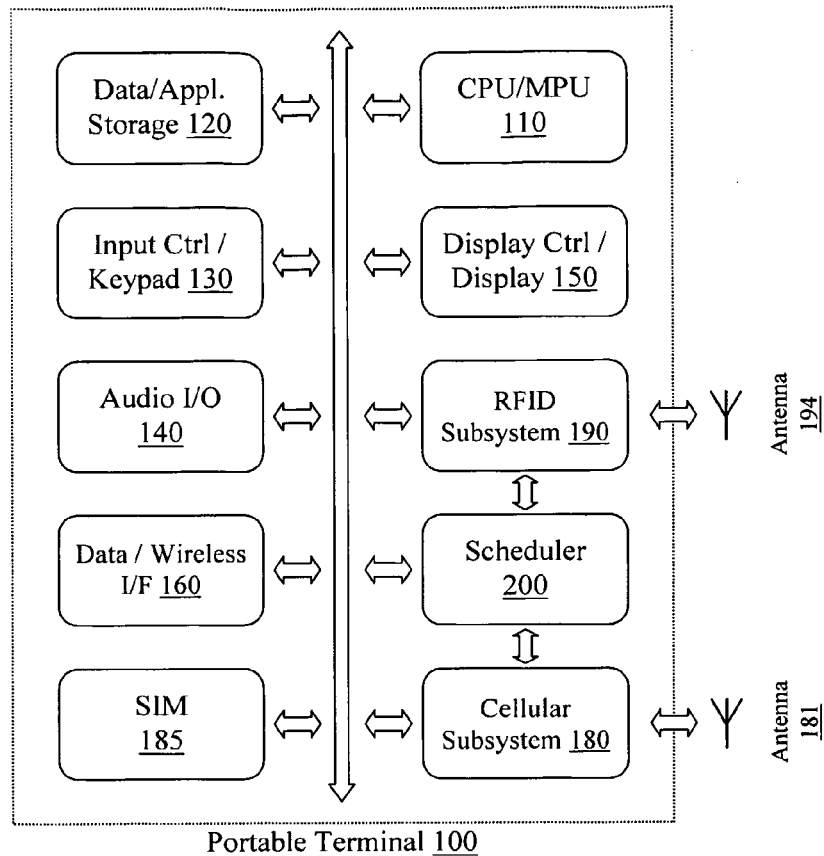
FIG. 2a illustrates schematically a principle block diagram of a portable cellular terminal enabled for radio frequency identification (RFID) communication according to an embodiment of the present invention.

FIG. 2 shows a schematic block illustration of components of a portable electronic terminal 100 in an exemplar form of a mobile/cellular telephone terminal. The portable electronic terminal 100 exemplarily represents any kind of processing terminal or device employable with the present invention. It should be understood that the present invention is neither limited to the illustrated portable electronic terminal 100 nor to any other specific kind of processing terminal or device.

As aforementioned, the illustrated portable electronic terminal 100 is exemplarily carried out as cellular communication enabled portable user terminal. In particular, the portable electronic terminal 100 is embodied as a processor-based or micro-controller based system comprising a central processing unit (CPU) and a mobile processing unit (MPU) 110, respectively, a data and application storage 120, cellular communication means including cellular radio frequency interface (I/F) 180 with correspondingly adapted RF antenna (181) and subscriber identification module (SIM) 185, user interface input/output means including typically audio input/output (I/O) means 140 (conventionally a microphone and a loudspeaker), keys, keypad and/or keyboard with key input controller (Ctrl) 130 and a display with display controller (Ctrl) 150, and a (local) wireless and/or wired data interface (I/F) 160.

The operation of the portable electronic terminal 100 is controlled by the central processing unit (CPU)/mobile processing unit (MPU) 110 typically on the basis of an operating system or basic controlling application, which controls the functions, features and functionality of the portable electronic terminal 100 by offering their usage to the user thereof. The display and display controller (Ctrl) 150 are typically controlled by the processing unit (CPU/MPU) 110 and provide information for the user including especially a (graphical) user interface (UI) allowing the user to make use of the functions, features and functionality of the portable electronic terminal 100. The keypad and keypad controller (Ctrl) 130 are provided to enable the user inputting information.

The information input via the keypad is conventionally supplied by the keypad controller (Ctrl) to the processing unit (CPU/MPU) 110, which may be instructed and/or controlled in accordance with the input information. The audio input/output (I/O) means 140 includes at least a speaker for reproducing an audio signal and a microphone for recording an audio signal. The processing unit (CPU/MPU) 110 can control conversion of audio data to audio output signals and the conversion of audio input signals into audio data, where for instance the audio data have a suitable format for transmission and storing. The audio signal conversion of digital audio to audio signals and vice versa is conventionally supported by digital-to-analog and analog-to-digital circuitry e.g. implemented on the basis of a digital signal processor (DSP, not shown).

The keypad operable by the user for input comprises for instance alphanumeric keys and telephony specific keys such as known from ITU-T keypads, one or more soft keys having context specific input functionalities, a scroll-key (up/down and/or right/left and/or any combination thereof for moving a cursor in the display or browsing through the user interface (UI), a four-way button, an eight-way button, a joystick or/and a like controller.

The portable electronic terminal 100 according to a specific embodiment illustrated in FIG. 2 includes the cellular communication subsystem 180 coupled to the radio frequency antenna (181) and operable with the subscriber identification module (SIM) 185. The cellular communication subsystem 180 is arranged as a cellular transceiver to receive signals from the cellular antenna, decodes the signals, demodulates them, and also reduces them to the base band frequency. The cellular communication subsystem 180 provides for an over-the-air interface, which serves in conjunction with the subscriber identification module (SIM) 185 for cellular communications with a corresponding base station (BS), base station controller, nodeB, and the like of a radio access network (RAN) of a public land mobile network (PLMN). The output of the cellular communication subsystem 180 thus consists of a stream of data that may require further processing by the processing unit (CPU/MPU) 110. The cellular communication subsystem 180 arranged as a cellular transceiver is also adapted to receive data from the processing unit (CPU/MPU) 110, which is to be transmitted via the over-the-air interface to the base station (BS) of the radio access network (RAN) (not shown). Therefore, the cellular communication subsystem 180 encodes, modulates and up-converts the data embodying signals to the radio frequency, which is to be used for over-the-air transmissions. The antenna (outlined) of the portable electronic terminal 100 then transmits the resulting radio frequency signals to the corresponding base station (BS) of the radio access network (RAN) of the public land mobile network (PLMN). The cellular communication subsystem 180 preferably supports a $2^{nd}$ Generation digital cellular network such as GSM (Global System for Mobile Communications) which may be enabled for GPRS (General Packet Radio Service) and/or EDGE (Enhanced Data for GSM Evolution; 2.5 Generation), a $3^{rd}$ generation digital cellular network such as any CDMA (Code Division Multiple Access) System including especially UMTS (Universal Mobile Telecommunications System) and cdma2000 System, and/or any similar, related, or future (3.5 Generation, $4^{th}$ Generation) standards for cellular telephony.

The wireless and/or wired data interface (I/F) 160 is depicted exemplarily and should be understood as representing one or more data interfaces, which may be provided in addition to or as an alternative of the above described cellular communication subsystem 180 implemented in the exemplary portable electronic terminal 100. A large number of wireless communication standards are available today. For instance, the portable electronic terminal 100 may include one or more wireless interfaces operating in accordance with any IEEE 802.xx standard, Wi-Fi standard, WiMAX standard, any Bluetooth standard (1.0, 1.1, 1.2, 2.0+EDR, LE), ZigBee (for wireless personal area networks (WPANs)), Infra-Red Data Access (IRDA), Wireless USB (Universal Serial Bus), and/or any other currently available standards and/or any future wireless data communication standards such as UWB (Ultra-Wideband).

Moreover, the data interface (I/F) 160 should also be understood as representing one or more data interfaces including in particular wired data interfaces implemented in the exemplary portable electronic terminal 100. Such a wired interface may support wire-based networks such as Ethernet LAN (Local Area Network), PSTN (Public Switched Telephone Network), DSL (Digital Subscriber Line), and/or other available as well as future standards. The data interface (I/F) 160 may also represent any data interface including any proprietary serial/parallel interface, a universal serial bus (USB) interface, a Firewire interface (according to any IEEE 1394/1394a/1394b etc. standard), a memory bus interface including ATAPI (Advanced Technology Attachment Packet Interface) conform bus, a MMC (MultiMediaCard) interface, a SD (SecureData) card interface, Flash card interface and the like.

Figure 1:
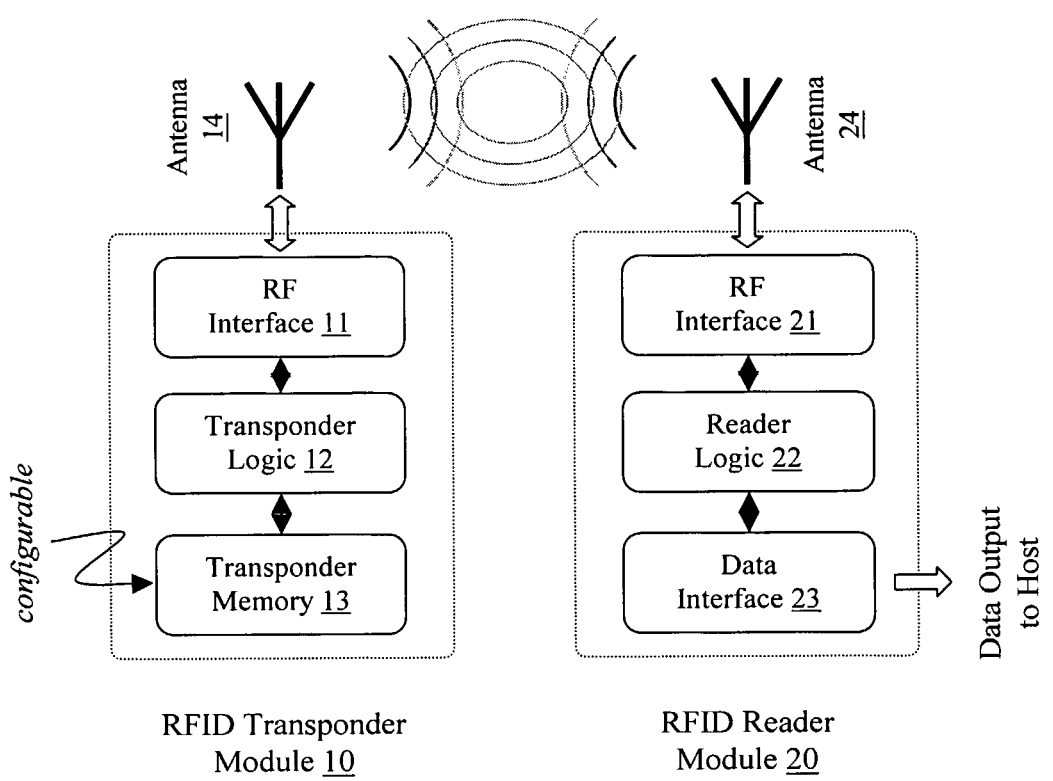
FIG. 1 illustrates schematically principle block diagrams depicting typical components of a radio frequency identification (RFID) transponder and a radio frequency identification (RFID) reader subsystem.

The portable electronic terminal 100 according to an embodiment of the present invention comprises a radio frequency identification (RFID) reader subsystem 190 coupled to a RF antenna 194. Reference should be given to FIG. 1 and the aforementioned description thereof, which illustrates the basic implementation and operation of a radio frequency identification (RFID) reader module. The radio frequency identification (RFID) reader subsystem 190 may be included in the terminal 100, fixely connected to the terminal 100, or detachably coupled to the terminal 100. Moreover, the radio frequency identification (RFID) reader subsystem 190 may be provided with a functional cover of the portable electronic terminal 100, which is detachably mounted to the portable electronic terminal 100. Preferably the radio frequency identification (RFID) reader subsystem 190 may be integrated in such a detachable functional cover. In accordance with the inventive concept of the present invention, a scheduler 200 is comprised by the terminal 100. The scheduler 200 is connected to the terminal 100, the cellular interface 180, and/or the radio frequency identification (RFID) reader subsystem 190. Details about the specific implementation of the radio frequency identification (RFID) reader subsystem 190 and the scheduler 200 are presented in the following.

The components and modules illustrated in FIG. 2 may be integrated in the portable electronic terminal 100 as separate, individual modules, or in any combination thereof. Preferably, one or more components and modules of the portable electronic terminal 100 may be integrated with the processing unit (CPU/MPU) forming a system on a chip (SoC). Such system on a chip (SoC) integrates preferably all components of a computer system into a single chip. A SoC may contain digital, analog, mixed-signal, and also often radio-frequency functions. A typical application is in the area of embedded systems and portable systems, which are constricted especially to size and power consumption constraints. Such a typical SoC consists of a number of integrated circuits that perform different tasks. These may include one or more components comprising microprocessor (CPU/MPU), memory (RAM: random access memory, ROM: read-only memory), one or more UARTs (universal asynchronous receiver-transmitter), one or more serial/parallel/network ports, DMA (direct memory access) controller chips, GPU (graphic processing unit), DSP (digital signal processor) etc. The recent improvements in semiconductor technology have allowed VLSI (Very-Large-Scale Integration) integrated circuits to grow in complexity, making it possible to integrate all components of a system in a single chip.

Typical applications operable with the portable electronic terminal 100 comprise beneath the basic applications enabling the data and/or voice communication functionality a contact managing application, a calendar application, a multimedia player application, a WEB/WAP browsing application, and/or a messaging application supporting for instance Short Message Services (SMS), Multimedia Message Services (MMS), and/or email services. Modern portable electronic terminals are programmable; i.e. such terminals implement programming interfaces and execution layers, which enable any user or programmer to create and install applications operable with the portable electronic terminal 100. A today's well established device-independent programming language is JAVA, which is available in a specific version adapted to the functionalities and requirements of mobile device designate as JAVA Micro Edition (ME). For enabling execution of application programs created on the basis of JAVA ME the portable electronic terminal 100 implements a JAVA MIDP (Mobile Information Device Profile), which defines an interface between a JAVA ME application program, also known as a JAVA MIDlet, and the portable electronic terminal 100. The JAVA MIDP (Mobile Information Device Profile) provides an execution environment with a virtual JAVA engine arranged to execute the JAVA MIDlets. However, it should be understood that the present invention is not limited to JAVA ME programming language and JAVA MIDlets; other programming languages especially proprietary programming languages are applicable with the present invention.

The principle concept of the present invention addresses the coexistence of a radio frequency identification (RFID) reader 190 and a cellular radio interface 180 and their concurrent operation. The concept of the present invention will be described with reference to UHF radio frequency identification (RFID) communication, especially EPCglobal conform standard for radio frequency identification (RFID) communication. Moreover, the concept of the present invention will also be described with reference a cellular radio interface 180 especially supporting GSM, GSM/EDGE, WCDMA and/or cdma2000. Nevertheless it should be noted that the present invention is not limited to those specific embodiments. Those skilled in the art will appreciate on the basis of the description that the concept of the present invention is likewise applicable with any other radio frequency identification (RFID) communication standard and wireless communication standard (including especially any other cellular communication standards and wireless network communication standards).

As aforementioned, there are allocated specific frequency bands for UHF radio frequency identification (RFID) communication:

| | |
|---|---|
| UHF RFID 868 ISM band (Europe): | 868-870 MHz (at max. 500 mW); and |
| UHF RFID 915 band (USA): | 902-928 MHz (at max 4 W). |

According to the different cellular standards various frequency bands are allocated for cellular communication. The following table lists a selection of frequency bands used; the table is not exhaustive. For later reference, commonly accepted abbreviations for the different frequency bands are denoted.

| System Designation | Uplink RF Band [MHz] | Downlink RF Band [MHz] |
|---|---|---|
| GSM 900 (Europe): | 890-915 | 935-960 |
| GSM 1800 (Europe): | 1710-1785 | 1805-1880 |
| GSM 850 (USA): | 824-849 | 869-894 |
| GSM 1900 (USA): | 1850-1910 | 1930-1990 |
| cdma2000 (USA): | 1850-1910 | 1930-1990 |
| WCDMA 2100 (Europe): | 1920-1980 | 2110-2170 |

The skilled reader will appreciate that the frequency bands used by UHF radio frequency identification (RFID) communication and cellular communications do not overlap. Hence, the concurrent operation of cellular as well as UHF radio frequency identification (RFID) communication could be obtained by utilizing RF components of highest quality, at least theoretically. In practice, such highest quality components would be bulky and expensive. Hence, from cost and size point of view, a solution with ability to schedule operations of those radios preferably in time domain would be preferable.

The excitation/interrogation signal, i.e. the downlink signal of an UHF radio frequency identification (RFID) reader is typically an amplitude or phase modulated carrier. The power of the signal is dependent on the application, but it might be several Watts in industrial applications and possibly a couple of hundreds of milliwatts in portable terminal related applications. Typically, the radio frequency identification (RFID) reader emits its excitation signal based on user action (e.g. input signal detected upon pressing a button by the user) or application request (e.g. generated by an application for instance upon timer expiry). During the exchange of data between the radio frequency identification (RFID) reader and the radio frequency identification (RFID) transponder, the radio frequency identification (RFID) reader continuously emits the carrier signal to keep the radio frequency identification (RFID) transponder energized (cf. aforementioned description). The emission of a powerful carrier in an uncoordinated manner during any cellular radio operation would be detrimental to the cellular radio performance, and therefore this kind of situation should be avoided.

According to an embodiment of the present invention the portable terminal 100 has a control entity, which enables the radio frequency identification (RFID) reader operation only in coordination with any cellular radio transceiver operation such that preferably a concurrent or simultaneous operation of both radio frequency identification (RFID) communication and cellular communication is obtainable.

Herein, it should be understood that concurrent and/or simultaneous communication operations may be operated on physical level (low layer level) time multiplexed, where the time multiplexing is transparent for the user such that substantially concurrent and/or simultaneous communication operations are experienced.

In the first basic case the control entity, the scheduler 200 comprised by the portable terminal 100, checks whether the cellular radio is (totally) turned off before the schedulers allows the radio frequency identification (RFID) reader to start its interrogation and communication. This first basic approach is quite simple, since ramping up the cellular operation takes some time in a case where the cellular connection is needed right away after the radio frequency identification (RFID) communication activity.

In a more sophisticated approach, the radio frequency identification (RFID) communication activity is scheduled to take place during the inactive periods of the cellular operation. The same principle can be applied to different states of the terminal. When the terminal is not attached to the cellular network, the radio frequency identification (RFID) reading situation is quite straight forward. Irrespective of the cellular system in question, in the idle/standby operation mode the terminal listens to paging messages, performs measurements related to intra-cell power levels and related to adjacent cell (inter-cell) power levels and availability of other systems, and sends random access messages, when required. The required activity in this state is quite low to ensure long battery life, and hence there is plenty of time for radio frequency identification (RFID) communication activity. In the active state, the terminal is either engaged to a voice call or data exchange through a packet connection. This state, and also states preceding and following the active state (e.g. ready state in GPRS), requires a significant amount of activity, and hence the time available for radio frequency identification (RFID) reading operation is quite limited. For example, there is only $(8-2) \times 0.577$ ms $\approx 3.5$ ms time (note that according to GSM time frame structure, each frame comprises eight time slots) to accomplish radio frequency identification (RFID) reading operations during an active GSM call, since most probably both cellular transmission (1 time slot out of 8 time slots) and reception (1 time slot) would be disturbed by radio frequency identification (RFID) reading activity at these time slots.

Consequently, according to the present invention the scheduler 200 establishes an interface between a radio frequency identification (RFID) subsystem, which is herein embodied as radio frequency identification (RFID) reader subsystem 190, and the host system, which is herein embodied as portable terminal 100. By the means of a scheduler algorithm, which is preferably implemented on the basis of the scheduler 200 with the help of hardware and/or software implementation, the concurrent multi-radio operation in the aforementioned manner is enabled. The control over the radio frequency identification (RFID) subsystem operation is exercised by the host system (i.e. portable terminal 100) via the scheduler 200. To enable the control, the radio frequency identification (RFID) subsystem (i.e. radio frequency identification (RFID) reader subsystem 190) may be provided with (digital I/O) trigger signal terminal 196 and watchdog logic.

Figure 2B:
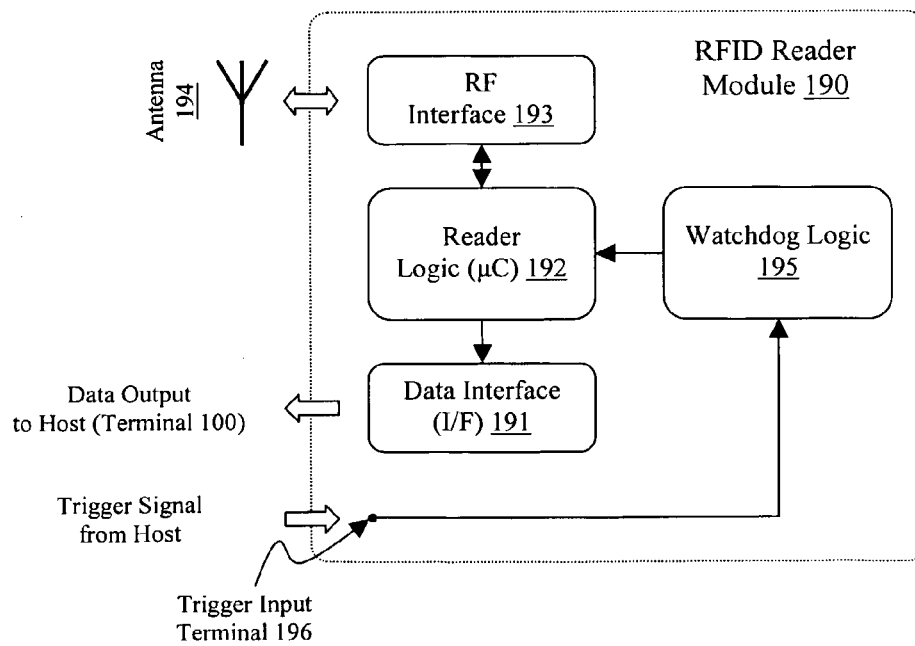
FIG. 2b illustrate schematically a principle block diagram of a radio frequency identification (RFID) reader subsystem according to an embodiment of the present invention.

With reference to FIG. 2b, a radio frequency identification (RFID) subsystem on the basis of the radio frequency identification (RFID) reader subsystem 190 according to an embodiment of the present invention is illustrated. As aforementioned, the radio frequency identification (RFID) reader subsystem 190 includes the typical components required for radio frequency identification (RFID) reader operation, namely a data interface (I/F) 191 coupled to the host system (i.e. the portable terminal 100), a reader logic 192 for instance implemented on the basis of a micro-controller (µC), and a radio frequency (RF) interface 193 coupled to a RF antenna 194. A watchdog logic 195 according to an embodiment of the present invention is arranged to enable controllability over the operation of the radio frequency identification (RFID) reader subsystem 190. The watchdog logic 195 may be integrated into the reader logic or implemented separately. The watchdog logic 195 may be supplied with a trigger signal from the host system (portable terminal 100) through a trigger terminal 196. The trigger signal is provided by the scheduler 200 and generated in accordance with the scheduling algorithm.

The scheduling algorithm will be described in more detail below. It should be noted that the data interface (I/F) 191 connected to the host system may be likewise arranged to receive configuration data and instructions from the host system. The configuration data and instructions allow defining details of the radio frequency identification (RFID) reader operation.

Figure 3A:
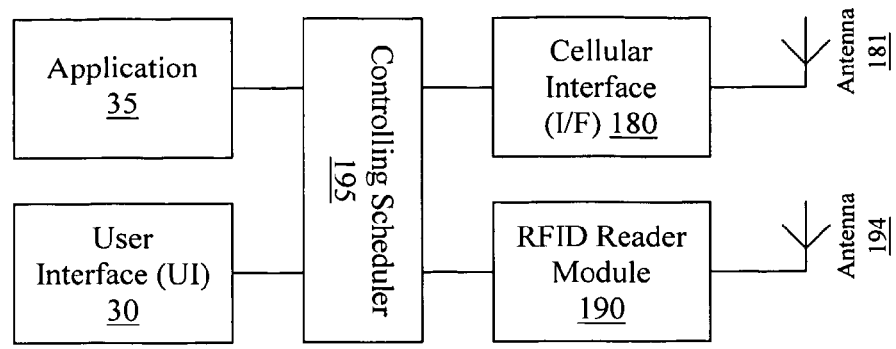
FIGS. 3a to 3c illustrate schematically principle block diagrams of different implementations of the portable cellular terminal enabled for radio frequency identification (RFID) communication according to an embodiment of the present invention.
Figure 3B:
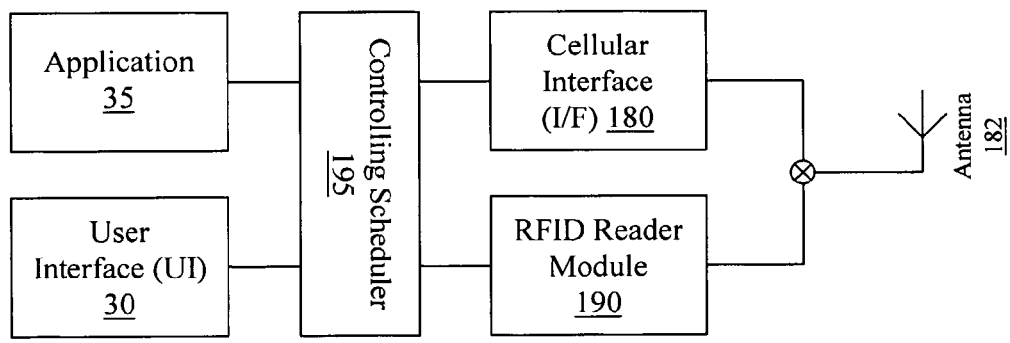
Figure 3C:
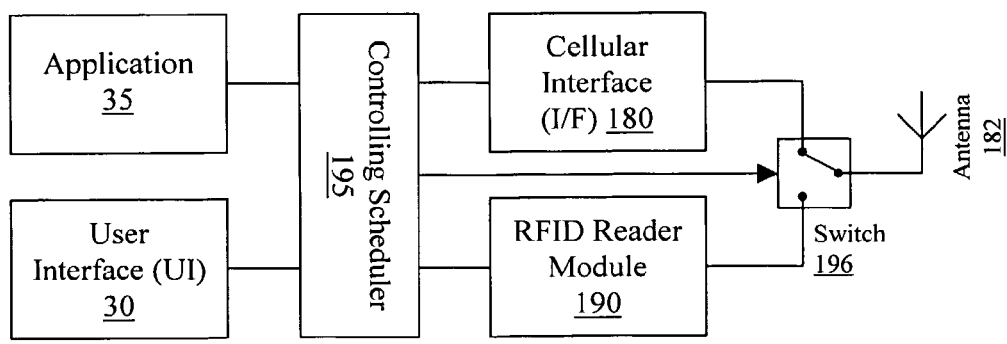

With reference to FIGS. 3a to 3c schematic diagrams of the major components allowing concurrent communication operations according to an embodiment of the present invention are illustrated.

The host system is operated by the user via a user interface (UI) 30, by the means of which the user is allowed to access the functions of the host system (e.g. the portable terminal 100). In view of the multi-radio operation, the control exercised by the user via the user interface (UI) 30 is performed through the controlling scheduler 200, which is interposed between the cellular communication subsystem 180 and the radio frequency identification (RFID) reader subsystem 190. The arrangement of the controlling scheduler 200 enables on the one side to obtain information about the actual radio communication operations performed via the cellular communication subsystem 180 as well as the radio frequency identification (RFID) reader subsystem 190 and on the other side to supply this obtained information and user inputs via the user interface to the scheduling algorithm to enable the concurrent multi-radio operation. In analogy, the control may be also exercised by an application 35, which is enabled controlling operation of the cellular communication subsystem 180 and the radio frequency identification (RFID) reader subsystem 190 through the controlling scheduler 200.

In detail, FIGS. 3a to 3c depict different antenna arrangements including separate antennas 181 and 194 for the cellular communication subsystem 180 as well as the radio frequency identification (RFID) reader subsystem 190, a common antenna 182 coupled to both the cellular communication subsystem 180 and the radio frequency identification (RFID) reader subsystem 190 and a common antenna 182 coupled to the both subsystems 180, 190 via a switch 196. The common antenna 182 is preferably a multi-frequency antenna, i.e. an antenna which characteristics is adapted to several frequency bands. Such antennas are for instance known in the field of dual and tri-band GSM terminals. With reference to the implementation shown in FIG. 3b, frequency band-pass filters (not shown) may be included into the signal path between antenna 183 and the cellular communication subsystem 180 as well as the radio frequency identification (RFID) reader subsystem 190 to separate RF signals received by the antenna 183 such that frequencies of different frequency bands are supplied to the respective subsystem 180 or 190 in accordance with the corresponding operation radio frequency bands. With reference to the implementation shown in FIG. 3c, a RF switch 196 is arranged to selectively couple the common antenna 182 to either of the subsystems 180 and 190 in accordance with a time-aligned operation thereof. The RF switch 196 may be also implemented as a tunable band-pass filter circuitry. The signal for adjusting the tunable band-pass filter circuitry is supplied by the controlling scheduler 200. The signal separation proposed with reference to FIG. 3c is advantageous to RF circuitries of the cellular communication subsystem 180 as well as the radio frequency identification (RFID) reader subsystem 190 since RF signals generated by one of the subsystems 180 or 190 is not applied to the respective other one. In particular, the implementation schematically illustrated in FIG. 3c drives the requirement to schedule of the operation of the both subsystems 180 and 190 in a time-aligned way. The common antenna 182 is selectively coupled to either of the subsystems 180 and 190. RF signal reception and RF signal emission is either operable with either the cellular communication subsystem 180 or the radio frequency identification (RFID) reader subsystem 190, respectively.

The scheduler 200 may be arranged separately from the subsystems 180 and 190, the scheduler 200 may be implemented together with the subsystems 180 and 190 within a multi-radio communication subsystem, the scheduler 200 may be implemented on the basis of one or more individual hardware and/or software components and/or these scheduler components may be part of the terminal 100, the cellular communication subsystems 180 or the radio frequency identification (RFID) reader subsystem 190.

Figure 4A:
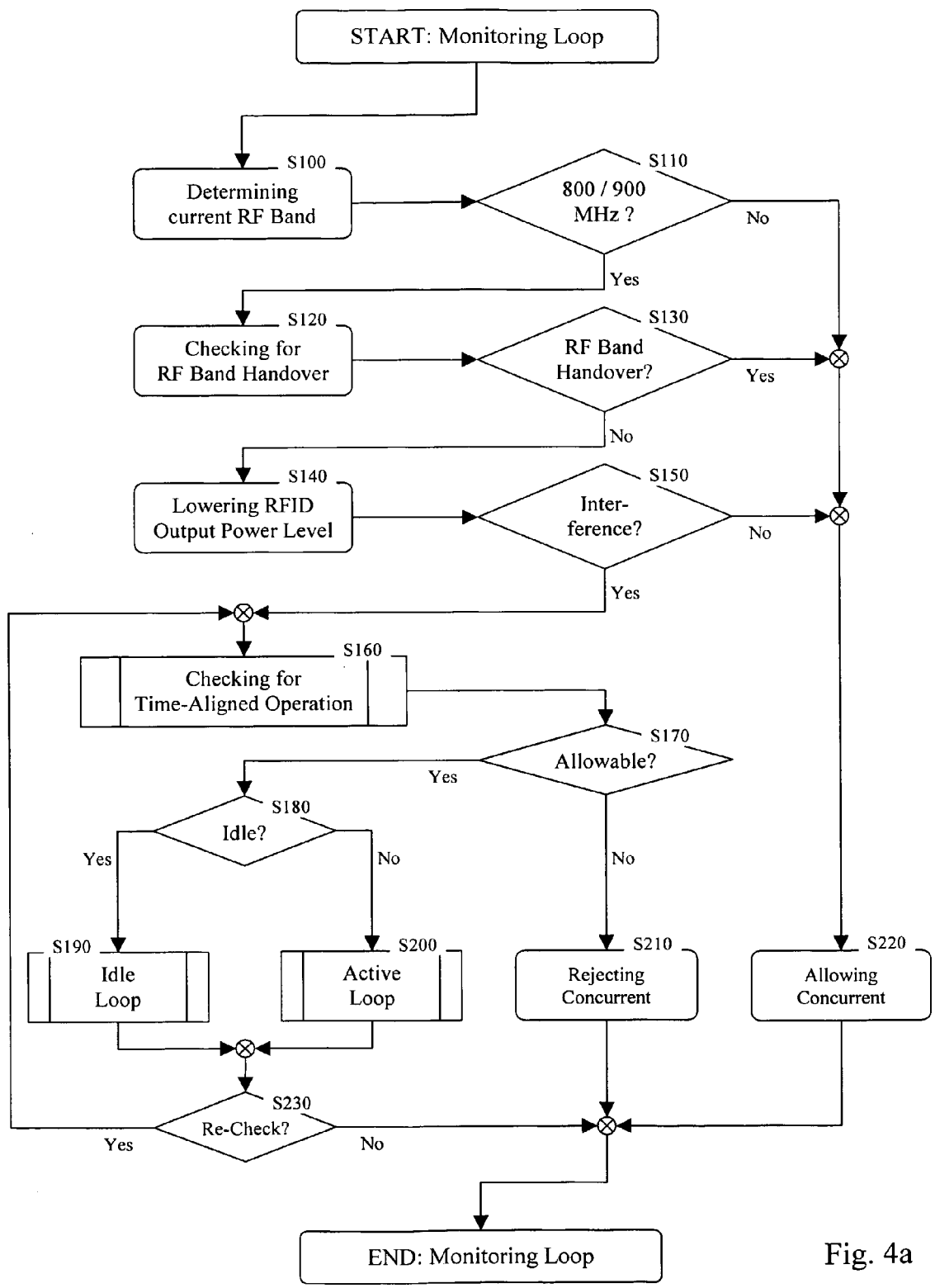
FIGS. 4a to 4d illustrate schematically operational sequences applicable with a scheduling mechanism to enable coordinated radio frequency identification (RFID) communication and cellular communication according to an embodiment of the present invention.

With reference to FIG. 4a, an overall operation sequence of the scheduling algorithm according to an embodiment of the present invention is illustrated. The operational sequence although depicted as a linear sequence should be understood as the core of a monitoring loop algorithm, which is performed repeatedly in time. Based on the monitoring loop operation and the ability to obtain information about the actual cellular operation frequency of the cellular communication subsystem 180, control over the radio frequency identification (RFID) reader subsystem 190 is exercised.

The scheduler 200 is preferably arranged to perform following operations when a user or an application requests the operation of the radio frequency identification (RFID) reader subsystem 190.

In operation S100, the actual frequency band is determined at which the cellular communication subsystem 180 is currently operated. The determination of the actual frequency band is performed independently whether the portable terminal operates currently in idle operation state or active operation state. It should be noted that the terms idle operation state, standby operation state, and active operation state address to the operation relating to the operativeness of the cellular communication subsystem 180. In particular, idle/standby operation state designates an operation mode of the cellular communication subsystem 180, where paging and measurement operations are performed but there is not performed any data or voice communication through the cellular communication subsystem 180. In active operation state, data and/or voice communication is performed via the cellular communication subsystem 180 with the Radio Access Network (RAN) of the Public Land Mobile Network (PLMN), to which the cellular communication subsystem is subscribed.

In operation S110, it is checked whether the cellular communication subsystem 180 is currently operated at the 850 MHz or 900 MHz frequency band (cf. frequency band definition given above). In case the cellular interface operates at another frequency band which is adequately spaced apart from the UH frequency used by the radio frequency identification (RFID) reader subsystem 190, it can be assumed that a concurrent operation of both the cellular communication subsystem 180 and the radio frequency identification (RFID) reader subsystem 190 is operable with diminished interference. The operational sequence branches to operation S220, where the concurrent operation is allowed. However, it should be noted that the allowance of a concurrent operation is merely possible in conjunction with a RF circuitry implementation which enables the concurrent reception and emission of RF signals at different frequencies such as depicted by the way of illustration with respect to FIGS. 3a and 3b. Principally, a RF circuitry implementation as embodied with reference to FIG. 3c does not enable such a concurrent operation. In such a case reference should be given to the time-alignment, which will be descried below with reference to operations S160 to S230.

In practice, almost all cellular terminals, which are on the marked today and which will be on the market in future, are at least multi-band terminals or preferably, multi-band, multi-system terminals. Typical cellular GSM conform terminals support GSM 900/1800 communication or GSM 850/1800/1900 communication. Moreover, latest cellular multi-system terminals support GSM 900/1800/1900 communication and WCDMA 2100 (UMTS) communication. The same applies to cellular terminals supporting CDMA, e.g. cdma2000 enabled cellular terminals supporting CDMA 850/1900 communication and are examples of available frequency combinations. Note that the cellular terminals specified above are described for the way of illustration; the present invention is not limited to any specific cellular multi-band and/or multi-system terminal.

Thus, portable terminals 100 may request to execute its idle or active operation state cellular transmissions and receptions at frequencies outside 860-960 MHz or at least in a frequency band which is spaced at an adequate distance at least in case the UHF radio frequency identification (RFID) communication is actively operated. In case the cellular communication subsystem 180 operates at the 850 MHz or 900 MHz frequency band, it is determined whether a radio frequency band handover is accomplishable in operation S130. The handover may be an intra-system handover and/or an inter-system. The handover operations should be requestable by the portable terminal 100 and the cellular communication subsystem 180, respectively.

The intra-system handover should be understood as a handover to another frequency band while preserving currently operated cellular system standard, e.g. from GSM 850 (USA) or GSM 900 (Europe) to GSM 1800 (Europe) and GSM 1900 (USA), respectively.

The inter-system handover should be understood as a handover to another cellular system standard which typically includes a frequency band handover, e.g. from GSM 900 (Europe) to WCDMA 2100 (Europe) or from GSM 850 (USA) to cdma2000 (USA). The inter-system handover may be also designated protocol handover.

It should be noted that requirements and necessitates for performing of intra-system as well as inter-system handover procedures have to be considered. For example, availability of radio frequency resources, availability of PLMNs supporting the desired cellular system standard, provider given limitations and use regulations, etc have to be taken into account. Details about the requirements could be derived from handover procedures defined in the respective cellular standards.

It should be further noted that a protocol handover from GSM to CDMA based system initiated on request of the terminal 100 (and the cellular communication subsystem 180, respectively) may require the adaptation of the current standards to enable such a protocol handover. In particular, GSM system does not specify a request allowing a cellular terminal to request idle or active operation state frequency band handover. The invention introduces such a handover procedure including request and response framework upon initiation of the portable terminal 100 capable for cellular communication. The inclusion of such a protocol handover according to an embodiment of the present invention is herewith proposed.

In case the handover is successfully accomplished, the operational sequence branches to operation S220. Note that the aforementioned comments on the allowing concurrent operation apply as well.

In operation S140, the radio frequency output power of the radio frequency identification (RFID) subsystem 190 is lowered. The reduction of the RF output power may accomplish a decreased interference level. In operation S150, the interference level in consequence to the reduced RF output power of the radio frequency identification (RFID) subsystem is determined. In case the interference level is below a predefined threshold, the concurrent operation can be allowed in operation S220. Note that the aforementioned comments on the allowing concurrent operation apply as well. The defined threshold may depend on priority considerations (prioritization of the cellular communication subsystem 180 or the radio frequency identification (RFID) reader subsystem 190), quality of service considerations (bandwidth requirements, interruption freeness), and types of communication (e.g. data packets, voice, or data stream communication) currently operated via the cellular communication subsystem 180, and the like.

Otherwise, it is checked in operation S160 whether time-aligned operation of the cellular communication subsystem 180 or the radio frequency identification (RFID) reader subsystem 190 is allowable. In particular, based on the operating profile of the cellular communication subsystem (e.g. GSM, cdma2000, and WCDMA, respectively) and the RF operation related values of radio frequency identification (RFID) subsystem, it is derived whether be time-aligned radio frequency identification (RFID) operation in coordination with the cellular communication operation (either in idle/standby operation state or in active operation state) is allowable.

The allowability of time-alignment depends on several conditions including especially whether the cellular communication subsystem 180 operates in idle/standby operation state or active operation state and more particularly, in case of active operation mode whether communication mode allows time-alignment. Those skilled in the art will appreciate that the decision whether time-aligned operation is possible or not requires a closer consideration of the different cellular standards introduced above. Details thereabout will be illustrated in the following operational sequence described below with reference to FIG. 4b.

In operation S170, according to the result of the checking operation S160 the time-aligned operation may be refused or allowed. Upon refuse, the operational sequence branches to operation S210, where for instance the user is informed that the concurrent and time-aligned operation is not available, respectively. Otherwise, the operational sequence is continued with operation S180, where the operation mode of the cellular communication subsystem is determined and depending on the operation mode, the operational sequence branches either to operation S190 or operation S200 to enable time-aligned operation in idle operation mode as well as in active operation mode of the cellular communication subsystem. Details about the idle operation state loop operation (S190) and active operation state loop operation (S200) are worked out in more detail with reference to FIGS. 4c and 4d, respectively.

In operation S230, which follows the idle operation state loop operation (S190) and active operation state loop operation (S200), a selective repetition of the check for time-aligned operation may be performed. In case such a repetition is desired, the operational sequence returns to operation S160. A selective repetition may be advantageous in view of a changing operation mode and/or communication mode of the cellular communication subsystem. More details will be apparent when reading the following description.

Figure 4B:
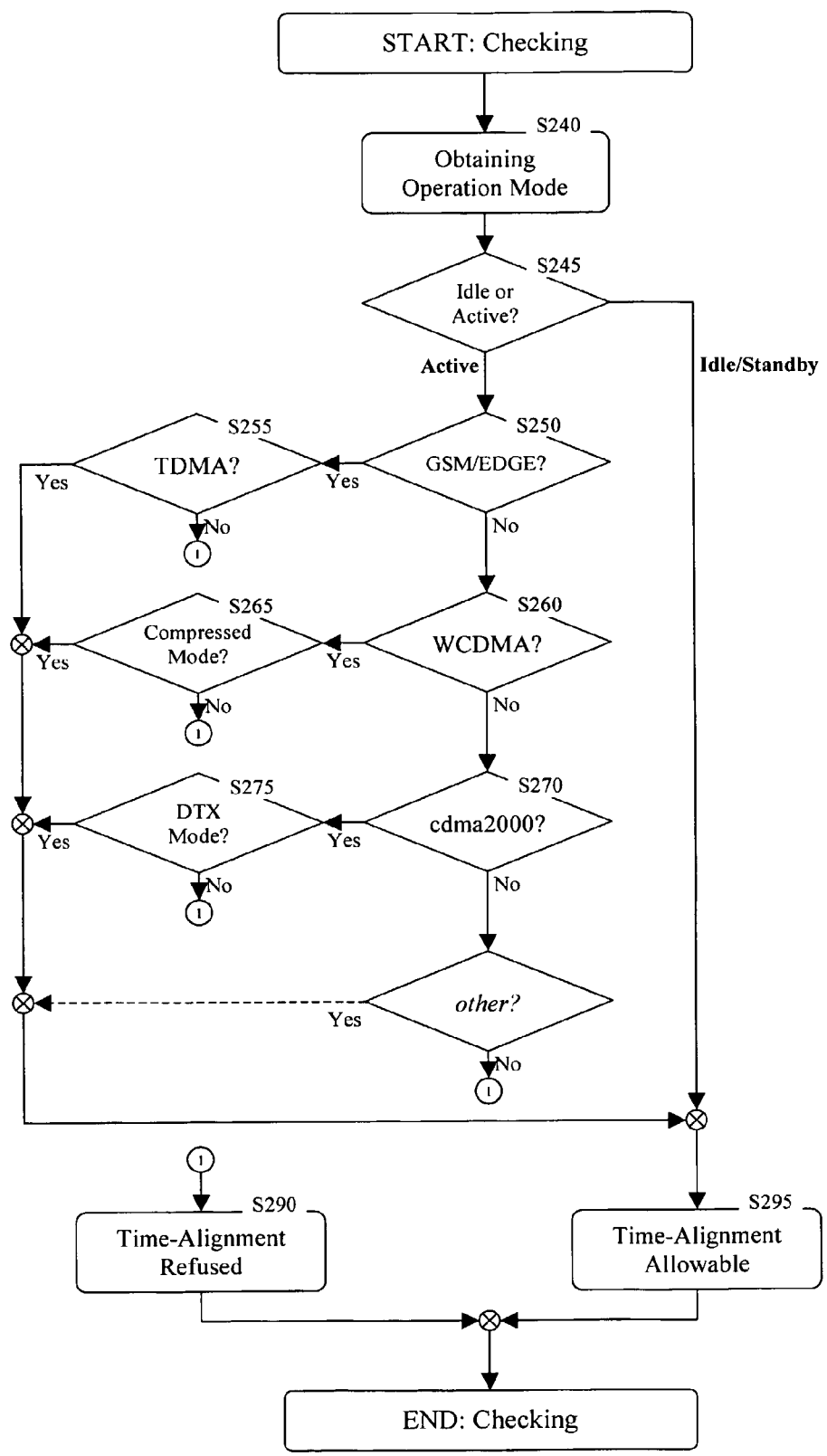

With reference to FIG. 4b, the checking for time-aligned operation according to an embodiment of the present invention is carried out in more detail. Additionally, reference will be given to details concerning different cellular standards.

In operation S240, the operation mode of the cellular communication subsystem is obtained. The operation mode may be idle/standby operation state or active operation state. In operation S245, the operational sequence branches in dependence on the determined operation mode of the cellular communication subsystem.

In case the operation mode is idle operation state, the time-aligned operation is allowable according to operation S295. The checking operation is finished.

An excursus should be given in the following paragraphs to operations of the cellular communication subsystem during idle/standby operation mode. Reference will be given to the aforementioned cellular standards.

GSM, GSM/GPRS, GSM/EDGE:

In case of GSM, GSM/GPRS, GSM/EDGE, the cellular system uses time division multiple access (TDMA) (in addition to Frequency Division Multiple Access; FDMA) to separate the data and/or voice communication between different cellular terminals within a cell and/or between neighboring cells. Hence, basically all communication operations are carried out in slotted manner with strict timings, i.e. the well-defined start and end timing of the data communication burst. Therefore, time frames with time slots are defined. The time slots are selectively allocated to one or more cellular terminals and channels. In consequence, each cellular terminal has its own determined intervals, within which transmission and/or reception is operable.

In general, the cellular communication subsystem does not operate any data or voice communication during idle operation state except of paging and measurement related communication.

In idle operation mode, a GSM/EDGE enabled terminal for instance listens to the Common Control Channel (CCCH) in order to discover possible paging done by the radio access network (RAN), base station (BS), the node B, or the like. The CCCH listening also ensures frequency and time synchronization of the cellular communication subsystem. The CCCH is received and decoded according to a pre-defined DRX (discontinuous reception) period, i.e. from once per two to once per nine 51 multi-frames (listening interval of approximately 0.5 s-2 s). Typically, the listening interval on the CCCH is about 2 seconds. In addition, a minimum of seven neighboring cells are monitored every time a page is listened to. The terminal does not transmit anything in the idle operation mode unless there is a need to do so. A need could be a call initiation in accordance with a user originated call, a response to a call set-up request (indicated by the means of a paging message) in accordance with mobile station terminated call, a periodic location update, etc. In case there are not any services in use, location updates are in practice the only activities requiring transmissions carried out by the cellular communication subsystem of the portable terminal. Hence, in general, during the idle operation mode, a GSM/EDGE enabled terminal listens to the CCCH for two to four slots in two seconds, and performs the received signal level measurements for the neighboring cell of the public land mobile network (PLMN); i.e. the base station (BS) of the neighboring cell. All other operations occur quite seldom, and therefore the CCCH reception mostly determines the allowed radio frequency identification (RFID) activity in this case.

Analog considerations apply to GSM and GSM/GPRS in idle operation mode. As a result, there are available periods of non-activity of the cellular communication subsystem during which (UHF) radio frequency identification (RFID) communication can be carried out. Moreover, the periods of activity of the GSM, GSM/GPRS, or GSM/EDGE cellular communication subsystem in idle operation mode and consequently also the periods of non-activity are well-defined.

WCDMA and CDMA (cdma2000):

Both cdma2000 and WCDMA (Wideband Code Division Multiple Access such as UMTS) utilize CDMA (Code Division Multiple Access) methodology as a multiple access method. The basis of CDMA is formed by spread spectrum modulated signals. A spread spectrum modulated signal is typically continuous by nature, and therefore the scheduling solution differs from the aforementioned GSM, GSM/GPRS, or GSM/EDGE case.

During the idle operation mode, a cdma2000 enabled terminal listens to the Forward Pilot Channel (F-PCH) of its own and neighboring cells in order to detect messages directed to it and measure the pilot strength to determine the need of an idle handoff. In addition, the cdma2000 enabled terminal listens to the Paging Channel (PCH) to detect possible incoming calls. It takes an average about 100 ms to listen to its own slot during the F-PCH slot cycle length of $2^{SCI}$ (SCI: SLOT_CYCLE_INDEX) in units of 1.28 s (e.g. SCI=1 ($2^{SCI}$=2) in US and SCI=2 ($2^{SCI}$=4) in Japan, typically). In case the cdma2000 PLMN supports Forward Quick Paging Channel (F-QPCH) indicators, the cdma2000 enabled terminal listens to its F-QPCH indicator for about 20 ms in addition to the listening of the slotted page, which happens approximately once in a minute.

In IS-2000 Release A the idle operation mode is a bit different from the one described above. The F-BCCH (Forward Broadcast Control Channel) containing overhead messages is only decoded when there is a need to access or when a new pilot is detected indicating a possible idle handoff. The F-CCCH (Forward Common Control Channel), carrying page messages to cellular terminals, is decoded when a page is detected on F-QPCH.

In case of WCDMA idle operation mode the WCDMA enabled terminal is camped to a cell, listens to system information, paging and notification messages and performs regular measurements to find out the strongest base station (BS) signal and neighboring base stations (BS, nodeB, etc) as well. Signal levels of the serving cell are measured at least every DRX (discontinuous reception) cycle (from 0.64 s to 5.12 s in idle operation state). There are also intra-frequency cell measurements (with a measurement cycle of 1.28 s to 5.12 s in idle operation state) and inter-frequency cell measurements (each frequency in every $(N_{carrier}-1)*1.28$ s to $(N_{carrier}-1)*5.12$ s cycle). Paging comprises listening to BCH and PCH transport channels sent in P-CCPCH (Primary Common Control Physical Channel) and S-CCPCH (Secondary Common Control Physical Channel), respectively. The WCDMA enabled terminal may also use discontinuous reception (DRX) in idle operation state, and in that case the WCDMA enabled terminal only needs to monitor one paging indicator from the Paging Indicator Channel (PICH). This happens once in each DRX cycle. Naturally, if the terminal initiates a call (terminal originated call), a message is sent on the RACH (Random Access Channel).

As a result, there are available periods of non-activity of the cellular communication subsystem, during which (UHF) radio frequency identification (RFID) communication can be carried out. Moreover, the periods of activity of the CDMA or WCDMA cellular communication subsystem in idle operation mode and consequently also the periods of non-activity are well-defined.

Referring back to FIG. 4b, in case the operation mode is active operation state an allowability of time-aligned operation or a refusing of time-aligned operation requires a more detailed consideration of the different cellular system standards.

In operation S250, it is checked whether the cellular communication subsystem is operable with GSM, GSM/GPRS, or GSM/EDGE communication and, in case the check matches, it is determined whether the time slot allocation enables time-aligned operation.

As aforementioned, a GSM, GSM/GPRS, or GSM/EDGE enabled cellular system uses time division multiple access (TDMA) (in addition to frequency division multiple access (FDMA)) to separate the data and/or voice communication between different cellular terminals within a cell and/or between neighboring cells. Hence, basically all communication operations are carried out in slotted manner with strict timings, i.e. well-defined the start and end timing of the data communication burst. This means, the decision of allowability or refuse of time-aligned operation has to consider whether time slots are available at which the cellular system is inactive (i.e. inactive in the means that one or more time-slots of a frame are not allocated to transmission or reception of data).

During either voice call or GPRS data call the cellular communication subsystem is active during its uplink and downlink slots of the TDMA (Time Division Multiple Access) frame, which are allocated for data uplink as well as data downlink transmission. There might be more than one slot allocated to the cellular communication subsystem in both (uplink and downlink) directions. Additionally, the cellular communication subsystem monitors the neighboring base stations (BS, nodeB, etc) once in a TDMA frame (comprising eight time slots), one base station at a time. According to the concept of the present invention, the radio frequency identification (RFID) reader subsystem collocated with a GSM, GSM/GPRS, or GSM/EDGE cellular communication subsystem has to avoid carrier wave transmission during the active periods of the cellular communication subsystem as aforementioned.

According to an embodiment of the present invention, FIG. 5a illustrates representatively an activity diagram of GSM/EDGE subsystem operated in time-aligned way with a radio frequency identification (RFID) reader subsystem. In particular, the activity diagrams illustrate activity states in case of a GSM/EDGE Dual Transfer Mode (DTM) case showing illustratively the interweaving of the activity periods of the both subsystems. FIG. 5a illustrates an allocation of two time slots (RX time slots #1 and #2) for downlink communication (RX) and one time slot (TX time slot #2) for uplink communication (TX). In addition, once in a TDMA frame (comprising times slots #0 to #7) one of the neighboring base stations (BS, nodeB, etc) is monitored on the basis of a measurement operation. The measurement operation is exemplarily interposed between time slots #4 and #5 with respect to the TDMA structure of the uplink communication channel. It should be noted that the uplink and downlink time slot allocation is exemplary; other time slot allocations for uplink communication and/or downlink communication may be used. In accordance with the uplink and downlink communication as well as the measurement operation, two periods of non-activity per each TDMA frame can be identified; i.e. a first period of non-activity (comprising substantially the TX time slots #0 and #1) interposed between the downlink operation and the uplink operation and a second period of non-activity (comprising substantially the TX time slot #3 and a part of TX time slot #4) interposed between the uplink operation and the measurement operation. These periods of non-activity of the cellular communication subsystem are applicable for operating the radio frequency identification (RFID) reader subsystem as exemplarily illustrated in FIG. 5a with respect to the RFID reader operation CW (continuous wave) window.

The skilled reader understands on the basis of the illustration of FIG. 5a that depending on the time slot allocation in TDMA systems one or more periods of non-activity may be available within the slotted time structure. These periods of non-activity of the cellular communication subsystem are applicable for operating the radio frequency identification (RFID) subsystem without having to be afraid of suffering of interference generated by cellular communication subsystem and the radio frequency identification (RFID) subsystem.

It should be also noted that the allocation of time slots for uplink and downlink communication is requestable by the cellular communication subsystem of the terminal. As a result, an adequate time slot allocation may be requested to obtain periods of non-activity which enables time-aligned operation of the both subsystems. The requesting of an adequate time slot allocation may be accompanied by a reduced uplink and/or downlink data rate of the cellular communication subsystem but enables advantageously the time-aligned operation.

As a result, depending on the time slot allocation time-aligned operation of the both subsystems may be allowed or rejected. In the first case of allowance, the operational sequence continues with operation S295, whereas in the latter case of rejection, the operational sequence continues with operation S290. In operation S290, the time-aligned operation is refused.

In operation S260, it is checked whether the cellular communication subsystem is operable with WCDMA communication and, in case the check matches, it is determined whether the communication mode is applicable with time-aligned operation, in operation S265.

As aforementioned, WCDMA (Wideband Code Division Multiple Access such as UMTS) utilizes CDMA (Code Division Multiple Access) methodology as a multiple access method. The basis of CDMA is formed by spread spectrum modulated signals. A spread spectrum modulated signal is typically continuous by nature, and therefore the scheduling solution differs from the aforementioned GSM, GSM/GPRS, or GSM/EDGE case.

While having a voice or data call in the WCDMA active operation mode, the cellular communication subsystem may use compressed mode to enable seemingly concurrent radio frequency identification (RFID) reader operation. Reference should be given to FIG. 5b, which illustrates an exemplary time structure of a compressed mode communication. Although WCDMA utilizes CDMA (Code Division Multiple Access) methodology as a multiple access method time multiplexing is likewise applied to separate different channels in the physical layer. The time multiplexing structure is typically based on a time frame structure, where each time frame comprises 15 time slots.

In the compressed (or slotted) mode the base station (BS, nodeB, etc), to which the cellular communication subsystem is communicates, assigns transmission gaps both in downlink and uplink to enable inter-cell measurements performed by the cellular communication subsystem of the terminal. Such inter-cell measurements are required for inter-frequency handover of the cellular communication subsystem of the terminal and are performed on the different WCDMA carrier frequencies. Several time slots can be allocated to perform this measurement. These allocated slots can be either in the middle of a single frame of spread over two frames.

In order to enable radio frequency identification (RFID) reader operation one, some or, all of the measurements supposed to be performed by the terminal (and the subsystem thereof, respectively) are skipped to leave sufficient time of non-activity applicable for operation of the radio frequency identification (RFID) subsystem. The Transmission Gap Length (TGL) and their timing are determined by the cellular Radio Access Network (RAN). The compressed frames are simultaneous in time in both uplink and downlink. The specified Transmission Gap Lengths (TGLs) are 3, 4, 7, 10, and 14 slots, i.e. from 2 ms to 9.3 ms.

The compressed mode operation can be achieved in different methods including decreasing of the spreading factor (e.g. by 2:1), puncturing bits (i.e. resulting to a reduced amount of information to be transmitted), or changed scheduling at higher layers (e.g. to require less time slots for communication).

With reference to FIG. 5b (1), in a compressed frame the slots from $\#N_{first}$ to $\#N_{last}$ defining the Transmission Gap Length are not used for data transmission. As illustrated exemplarily, the instantaneous transmit power is increased in the compressed frame in order to keep the quality of Service (Bit Error Rate, Frame Error Rate, etc.) unaffected by the reduced processing gain. The amount of power increase depends on the transmission time reduction method illustrated above. The frames to be compressed are indicated by the network. Principally in compressed mode, compressed frames can occur periodically, or requested on demand. The rate and type of compressed frames is variable and depends on the environment and the measurement requirements.

With reference to FIGS. 5b (2)-(4), different frame structures for uplink and downlink compressed frames are illustrated. Referring particularly to the downlink compressed frame structure, there are two different types of frame structures defined. Type A (cf. FIG. 5b (3)) maximizes the Transmission Gap Length (TGL), whereas type B is optimized for power control. The frame structure type A or B is set by higher layers independent from the downlink slot format type A or B. With frame structure of type A, the pilot field of the last slot in the transmission gap is transmitted. Transmission is turned off during the rest of the transmission gap. With frame structure of type B, the TPC field of the first slot in the transmission gap and the pilot field of the last slot in the transmission gap are transmitted. Transmission is turned off during the rest of the transmission gap.

Although, the compressed mode communication, Transmission Gap Length (TGL) and its timing are determined by the cellular Radio Access Network (RAN) those skilled in the art will appreciate that provisions may be made to enable the cellular communication subsystem of the terminal to instruct compressed mode communication and to determine its properties (length, timing).

As a result, compressed mode communication may be requested by the terminal to obtain periods of non-activity which enables time-aligned operation of the both subsystems. The originally arranged measurement operations are omitted. The requesting of compressed mode communication may be accompanied by a reduced uplink and/or downlink data rate of the cellular communication subsystem but enables advantageously the time-aligned operation.

As a result, depending on the communication mode time-aligned operation of the both subsystems may be allowed or rejected. In the first case of allowance, the operational sequence continues with operation S295, whereas in the latter case of rejection, the operational sequence continues with operation S290. In operation S290, the time-aligned operation is refused.

In operation S270, it is checked whether the cellular communication subsystem is operable with cdma2000 communication and, in case the check matches, it is determined whether the communication mode is applicable with time-aligned operation, in operation S275.

As aforementioned, cdma2000 utilizes also CDMA (Code Division Multiple Access) methodology as a multiple access method. The basis of CDMA is formed by spread spectrum modulated signals. A spread spectrum modulated signal is typically continuous by nature, and therefore the scheduling solution differs from the aforementioned GSM, GSM/GPRS, or GSM/EDGE case.

The cdma2000 enabled terminal activity is generally continuous while in active operation state. The only exception is Discontinuous Transmission (DTX) mode. In Discontinuous Transmission (DTX) mode, the activity of the cellular communication subsystem of the terminal is only 50% of the nominal on the reverse link (i.e. uplink direction). Similarly, there is also discontinuous transmission available for the forward link (i.e. downlink direction). These gaps in transmission and reception in uplink and downlink could be used to enable radio frequency identification (RFID) operation.

However it should be noted that Discontinuous Transmission (DTX) mode is only allowed in F-DCCH (Forward Dedicated Control Channel in cdma2000) and R-DCCH (Reverse Dedicated Control Channel), but voice data cannot be transferred on those channels.

If necessary, Discontinuous Transmission (DTX) mode may be requested by the cdma2000 enabled terminal. The requesting of Discontinuous Transmission (DTX) mode communication may be accompanied by a reduced uplink and/or downlink data rate of the cellular communication subsystem but enables advantageously the time-aligned operation.

As a result, depending whether Discontinuous Transmission (DTX) mode is available and applicable, time-aligned operation of the both subsystems may be allowed or rejected. In case of allowance, the operational sequence continues with operation S295, whereas in case of rejection, the operational sequence continues with operation S290. In operation S290, the time-aligned operation is refused.

Those skilled in the art will appreciate that the concept of the present invention described on the basis of the aforementioned embodied TDMA based cellular communication subsystems and CDMA based cellular communication subsystems is also applicable with other TDMA and CDMA based communication subsystems, respectively. This means that scheduling of a radio frequency identification (RFID) reader subsystem according to an embodiment of the present invention should not be limited to the aforementioned cellular communication subsystems.

In general, periods of non-activity are often provided in wireless communication systems to enable reduction of the power consumption of the respective wireless communication subsystem. The consideration of the power consumption addresses especially portable terminals (such as terminal 100), which are supplied by batteries and/or accumulators providing only a limited overall energy capacity. During periods of non-activity, the wireless communication subsystem may be power-down or at least operated in power saving modes.

Figure 4C:
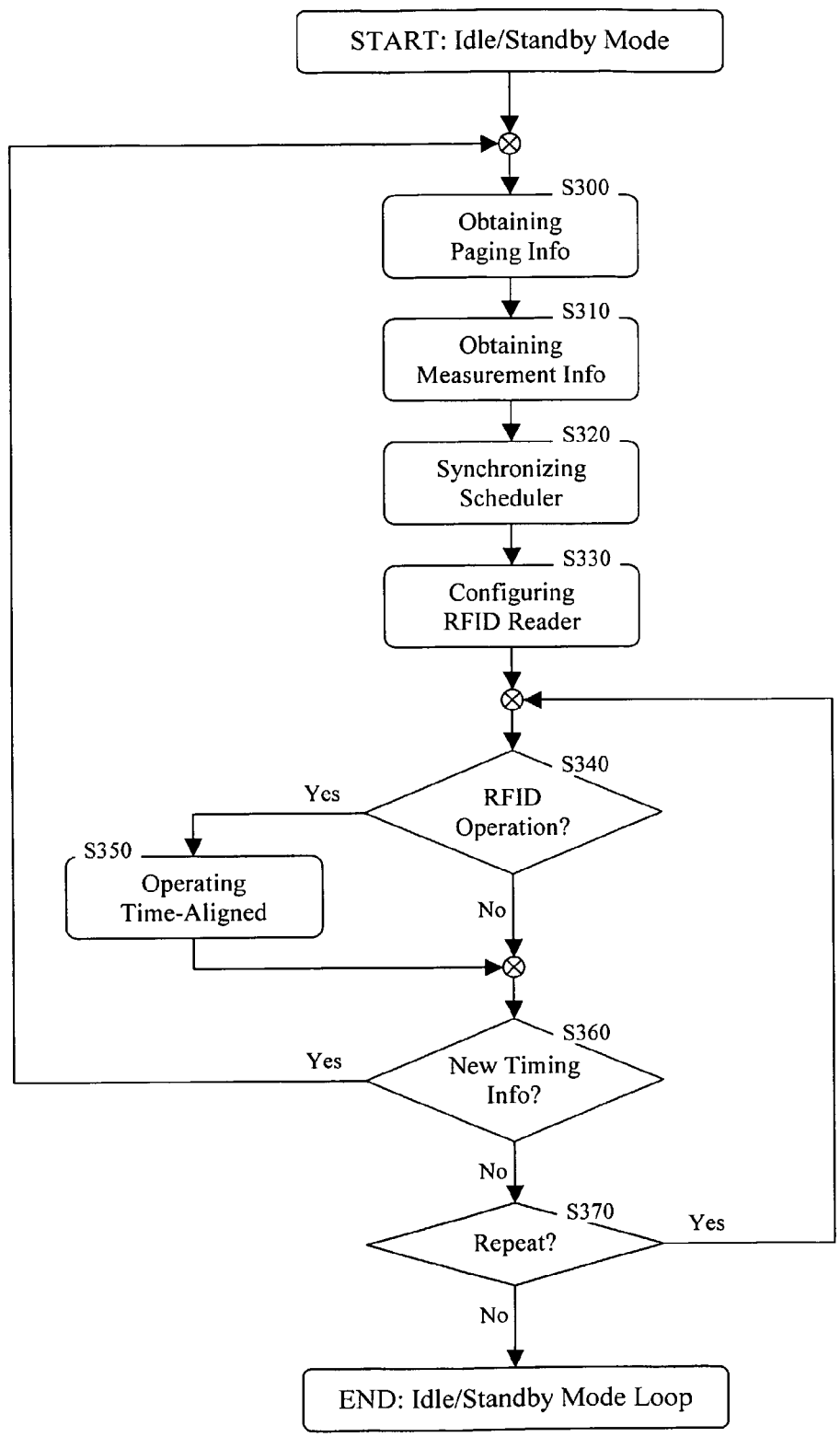

In view of the aforementioned discussion of the necessities and constraints required to enable time-aligned operation of the cellular communication subsystem and radio frequency identification (RFID) reader subsystem, reference should now be given to FIG. 4c which shows schematically an operational sequence of the idle/standby operation state loop procedure according to an embodiment of the present invention. The idle/standby operation state loop procedure is part of the overall operational sequence described above with reference to FIG. 4a.

Typically during the idle/standby operation mode the cellular communication subsystem of the terminal listens to the paging messages coming from the PLMN and base station (BS, nodeB, etc), respectively, in order to know whether a communication connection is to be established. Hence, when the radio frequency identification (RFID) enabled cellular terminal is switched on or the radio frequency identification (RFID) reader functionality of a cellular terminal is enabled, the scheduling of the time-aligned operation starts to operate according the following monitoring loop operations according to an embodiment of the present invention.

In operation S300, when attaching of the cellular communication subsystem to the Radio Access Network (RAN) or the base station (BS, nodeB, etc), or later on regularly during the idle/standby state, the cellular communication subsystem receives one or more system information messages, which include information about the paging group, to which the cellular communication subsystem is assigned, and hence also the paging timing.

In operation S310, when attaching of the cellular communication subsystem to the Radio Access Network (RAN) or the base station (BS, nodeB, etc), or later on regularly during the idle/standby state, the cellular communication subsystem receives also system information messages timing information about potential signal level measurements of neighboring base stations.

In operation S320, upon obtainment of the information relating to paging instances as well as information relating to the measurement instances, the information is supplied to the scheduler. Based on the timing information about the paging instants and measurement instants, the scheduler is synchronized to the paging and measurement timing in such a way that exact paging and measurement instants and their lengths are known. As a result, the scheduler is informed about the exact timing of the periods of activity and non-activity of the cellular communication subsystem; in particular, start and end timing of the activity and non-activity periods of the cellular communication subsystem.

In operation S330, further configuration of the scheduler and/or the radio frequency identification (RFID) reader subsystem is operable. Reference should be given to the description below.

In operation S340, the operation of the radio frequency identification (RFID) reader subsystem may be initiated. The initiation may be caused upon reception of a user input to the terminal or upon an initiation signal generated by an application executable on the terminal. Upon indication to initiate, the operational sequence continues with operation S350, otherwise the operational sequence branches to operation S360.

In operation S350, the scheduler aligns the radio frequency identification (RFID) reader operation timing in such a way that the operation is performed during periods of non-activity of the cellular communication subsystem. The periods of non-activity are determined on the basis of the information relating to paging instances as well as information relating to the measurement instances (cf. operation S320).

In an operation S360, it is checked whether new information concerning the scheduling of the time-aligned operation (i.e. paging instances related information and/or measurement instances related information) is available e.g. from system messages received from the Radio Access Network (RAN) by the cellular communication subsystem of the terminal. In case new information is available, the operational sequence returns to operation S300, otherwise the operational sequence continues with operation S370.

In operation S370, the time-aligned operation of the radio frequency identification (RFID) subsystem may be repeatedly performed. The operational sequence may return to operation S340 or to operation S350, when for example the radio frequency identification (RFID) subsystem operation is divided into several single radio frequency identification (RFID) subsystem operations.

It should be noted that operation mode of the cellular communication subsystem may change. This means, upon indication of the Radio Access Network (e.g. paging message, mobile terminated call set-up message, etc.) or in response to a user request (e.g. mobile originated call set-up message) the cellular communication subsystem may change from idle/standby operation mode to active operation mode. In case of a change of the operation mode to active operation mode the operational sequence may return to S160 described with respect to FIG. 4a, in order to check allowability of time-aligned operation in active operation mode.

Figure 4D:
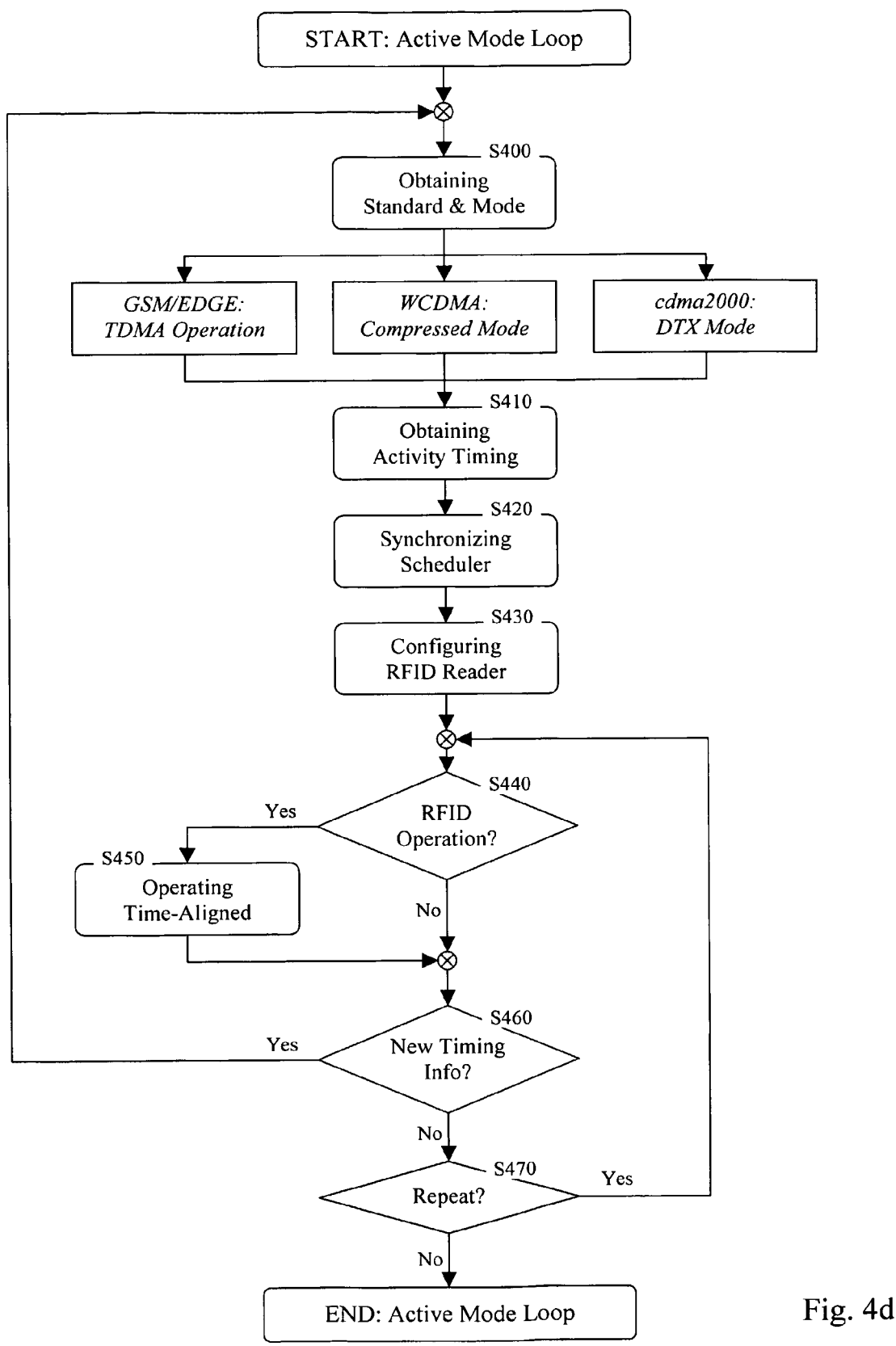

In view of the aforementioned discussion of the necessities and constraints required to enable time-aligned operation of the cellular communication subsystem and radio frequency identification (RFID) reader subsystem, reference should also be given to FIG. 4d, which shows schematically an operational sequence of the active operation state loop procedure according to an embodiment of the present invention. The active operation state loop procedure is part of the overall operational sequence described above with reference to FIG. 4a.

In case of active operation state (i.e. either voice call or data call currently performed) or states requiring similar kind of activity as the actual active operation state (e.g. ready state in GSM/GPRS), the radio frequency identification (RFID) subsystem operation has to be scheduled in such a way that overlap with cellular communication subsystem activity is prevented. According to an embodiment of the present invention, the active operation state includes the following operations.

In operations S400 and S410, the communication standard and mode as well as the activity timing related information is obtained. In particular, when the terminal enters the active (or similar) operation state, or later on regularly during the active operation state, the communication standard and mode (GSM, GSM/GPRS, GSM/EDGE, WCDMA compressed mode, cdma2000 DTX mode, etc.) and activity timing related information of the cellular communication subsystem is determined. The activity timing related information include especially the active slot timing in case of GSM, GSM/GPRS, GSM/EDGE, TGL timing in WCDMA compressed mode, or Discontinuous Transmission (DTX) timing in cdma2000 is obtained from the cellular communication subsystem. Reference should be given to the discussion given above with reference to FIG. 4b.

In operation S420, upon obtainment of the timing related information, the information is supplied to the scheduler. Based on the timing information about the paging instants and measurement instants, the scheduler is synchronized on the basis of the timing related information in such a way those non-activity periods and their lengths are known. As a result, the scheduler is informed about the exact timing of periods of activity and non-activity of the cellular communication subsystem; in particular, start and end timing of the activity and non-activity periods of the cellular communication subsystem.

In operation S430, further configuration of the scheduler and/or the radio frequency identification (RFID) reader subsystem is operable. Reference should be given to the description below.

In operation S440, the operation of the radio frequency identification (RFID) reader subsystem may be initiated. The initiation may be caused upon reception of a user input to the terminal or upon an initiation signal generated by an application executable on the terminal. Upon indication to initiate, the operational sequence continues with operation S450, otherwise the operational sequence branches to operation S460.

In operation S450, the scheduler aligns the radio frequency identification (RFID) reader operation timing in such a way that the operation is preformed during periods of non-activity of the cellular communication subsystem. The periods of non-activity are determined on the basis of the timing related information (cf. operation S420).

In an operation S460, it is checked whether new information concerning the scheduling of the time-aligned operation (i.e. paging instances related information and/or measurement instances related information) is available e.g. from system messages received from the Radio Access Network (RAN) by the cellular communication subsystem of the terminal. In case new information is available, the operational sequence returns to operation S300, otherwise the operational sequence may continue with operation S470.

In operation S470, the time-aligned operation of the radio frequency identification (RFID) subsystem may be repeatedly performed. The operational sequence may return to operation S440 or to operation S450, when for example the radio frequency identification (RFID) subsystem operation is divided into several single radio frequency identification (RFID) subsystem operations.

It should be noted that operation mode of the cellular communication subsystem may change. This means, upon indication of the Radio Access Network or in response to a user request the cellular communication subsystem may change from active operation mode to idle/standby operation mode. In case of a change of the operation mode to idle/standby operation mode the operational sequence may return to S160 described with respect to FIG. 4a, in order to check allowability of time-aligned operation in idle/standby operation mode or may directly branch to operation S300 described with respect to FIG. 4c.

The aforementioned description of the scheduling algorithm is focused on the requirements, which have to be met to enable principle time-alignment of the both subsystems. In the following, an optimized operation of the radio frequency identification (RFID) reader subsystem will be described. The optimization is advantageous to enable an effective operation of the radio frequency identification (RFID) reader subsystem within the non-activity periods, during which operativeness is allowable. According to an embodiment of the present invention, a configuration and control interface, preferably an application program interface (API), is provided to control and configure the operation of the radio frequency identification (RFID) reader subsystem. The configuration and control interface to the radio frequency identification (RFID) reader subsystem may be realized by data and command exchange through the data interface of the radio frequency identification (RFID) reader subsystem. It should be noted that the aforementioned specific digital I/O trigger signal terminal utilizable to synchronize the operation of the radio frequency identification (RFID) reader subsystem may be implemented as a separate signal input terminal to the watchdog logic of the radio frequency identification (RFID) reader subsystem or alternatively, the trigger signal may be supplied to the watchdog logic of the radio frequency identification (RFID) reader subsystem through the data interface thereof, as well. A separate trigger signal terminal may be preferable in order to ensure synchronicity with the trigger signal.

The configurability of the radio frequency identification (RFID) reader subsystem is preferably under the control of the scheduler, which also triggers the operation of the radio frequency identification (RFID) reader subsystem. Back reference should be given to the operations S330 and S430 of the idle and active operation mode loop procedures, respectively.

In general, the scheduling mechanism described in detail above uses timing related information to identify activity and non-activity periods of the cellular communication subsystem such that the scheduler prevents from operating the radio frequency identification (RFID) reader subsystem while the cellular communication subsystem operates, i.e. while the cellular communication subsystem for instance receives paging messages, performs measurements, sends or receives data packets, or sends random access data bursts. Among others, the scheduler is arranged to configure the maximum duration of a single RF emission to be not greater than a period of non-activity of the cellular communication subsystem and triggers the operation of the radio frequency identification (RFID) reader subsystem in correspondence with the expected start of the period of non-activity. The scheduler may use the specified digital I/O trigger signal terminal to trigger synchronized RF activity of the radio frequency identification (RFID) reader subsystem.

Reference should be given to FIG. 6a, which illustrates exemplary an activity time sequence on the basis of the GSM/EDGE DTM activity diagram shown in FIG. 5a according to an embodiment of the invention. For the way of illustration, a first period of activity $\Delta_{aI}$ and a second period of activity $\Delta_{aII}$ is identified as well as a first period of non-activity $\Delta_{nI}$ and a second period of non-activity $\Delta_{nII}$ is identified. In accordance with the periods of non-activity, RF signal periods of the radio frequency identification (RFID) reader subsystem are indicated as RFID Reader RF Activity Windows (cf. legend of FIG. 6a) signifying an RF emission, in conformance with the signal power level, accuracy and integrity requirements, from the antenna of the radio frequency identification (RFID) reader subsystem.

An optimized time for setting the trigger signal to start RF activity of the radio frequency identification (RFID) reader subsystem is a duration $\Delta_I$, which represents a ramp-up duration $\Delta_I$. The ramp-up duration $\Delta_I$ is required by the radio frequency identification (RFID) reader subsystem from receiving the trigger signal to beginning to transmit an RF signal in conformance with the signal power level, accuracy and integrity requirements of the radio frequency identification (RFID) reader system, from the antenna of the radio frequency identification (RFID) reader subsystem. Inter alia, the ramp-up duration $\Delta_I$ is caused by PLL (Phased Loop Lock) settling, micro-controller/logic warm-up, settling time of the RF interface, and/or other necessities before RF activity.

Preferably, an additional guard duration $\Delta_{II}$ should be considered between the end of the period of activity of the cellular communication subsystem and the beginning of the RF signal emission of the radio frequency identification (RFID) reader subsystem.

When considering the ramp-up duration $\Delta_I$ and the guard duration $\Delta_{II}$, the trigger signal initiating the operation of the radio frequency identification (RFID) reader subsystem should be set $\Delta_I - \Delta_{II}$ before an end of a period of activity of the cellular communication subsystem. When defining arbitrarily a reference point in time 0 coincident with an end of a period of activity as well as the beginning of a period of non-activity of the cellular communication subsystem, the trigger signal should be set at a point in time $T_I = \Delta_{II} - \Delta_I < 0$. The emission of a RF signal from the radio frequency identification (RFID) reader subsystem begins correspondingly at a point in time $T_{II} = \Delta_{II} > 0$, which is equal to the guard duration $\Delta_{II}$.

An optimized time for the resetting (releasing) the trigger signal to stop RF activity of the radio frequency identification (RFID) reader subsystem is a duration $\Delta_{III}$, which represents a ramp-down duration $\Delta_{III}$. The ramp-down duration $\Delta_{III}$ is required by the radio frequency identification (RFID) reader subsystem from detecting the trigger signal reset to the termination of the RF signal emission generated by the radio frequency identification (RFID) reader subsystem. The RF emission will be terminated before the start of the activity of the cellular communication subsystem, and hence also before time instant 0' and the end of the period $\Delta_{III}$. In contrast to the ramp-up duration $\Delta_I$, there is no need to ensure sufficient settling times of the PLL (phase-locked loop), the RF interface etc. during $\Delta_{III}$ in termination of the RF activity, since the power level, accuracy and integrity of the RF signal is not relevant as long as the output stage is disabled and there isn't any RF emission from the antenna of the radio frequency identification (RFID) reader subsystem.

When considering the ramp-down duration $\Delta_{III}$, the trigger signal reset terminating the operation of the radio frequency identification (RFID) reader subsystem should be set $\Delta_{III}$ before an end of a period of non-activity of the cellular communication subsystem. When defining arbitrarily a reference point in time 0' coincident with an end of a period of non-activity as well as the beginning of a period of activity of the cellular communication subsystem, the trigger signal should be set at a point in time $T_{III'}=-\Delta_{III}<0'$. Thus, the emission of an RF signal terminates correspondingly during a time period finishing before a reference point in time 0', such that interference with cellular activity is avoided.

Those skilled in the art will appreciate that the period of operation of the radio frequency identification (RFID) reader subsystem may be optimized by adjusting the guard duration $\Delta_{II}$ and considering the ramp-up duration $\Delta_I$ as well as the ramp-down duration $\Delta_I$. The ramp-up duration $\Delta_I$ as well as the ramp-down duration $\Delta_{III}$ are typically specific for the employed radio frequency identification (RFID) reader subsystem.

Further parameters of the radio frequency identification (RFID) reader subsystem may also enable adjustment and/or optimization of the operation of the radio frequency identification (RFID) reader subsystem. An optimization and adjustment of the operation of the radio frequency identification (RFID) reader subsystem is advantageous to utilize effectively the periods of non-activity of the cellular communication subsystem and adjust the operation of the radio frequency identification (RFID) reader subsystem to the specific lengths of periods of non-activity. The adjustment and/or optimization may include modification of some of the parameters of the radio frequency identification (RFID) reader subsystem.

Static Information:

The scheduler should be informed about at least a sleep clock cycle of the radio frequency identification (RFID) reader subsystem and the required ramp-up and ramp-down duration before RF activity and after RF activity of the radio frequency identification (RFID) reader subsystem. Also information relating to minimum, default, and maximum values as well as units of further parameters, which are enlisted below, should be available at the scheduler. This information is typically disclosed by manufacturer of the employed radio frequency identification (RFID) reader subsystem at a data sheet. The information is preferably stored in the scheduler or stored in the terminal to be accessible by the scheduler when required.

Semi-Static Standard Related Information:

Inter alia, the scheduler may obtain and optionally modify the following parameter values that are relevant to the duration of RF activity. Reference should be given to the EPCglobal standard generation 2. Following parameters may be relevant and will be described with reference to FIGS. 6b to 6d.

With reference to FIG. 6b, the power-up as well as power-down RF envelope of the interrogation RF signal is depicted. Reference should be given to the aforementioned discussion of the ramp-up duration and ramp-down duration. The rise time $T_r$ and fall time $T_f$ illustrated in FIG. 6b is comprised by the ramp-up duration $\Delta_I$ and ramp-down duration $\Delta_{III}$. However, it should be noted that FIG. 6b illustrates merely the envelope of the RF signal detectable at the RF interface of the radio frequency identification (RFID) reader subsystem. The rise time $T_r$ and fall time $T_f$ should be within the time range from 1 µs to 500 µs. After power-up, the interrogation signal requires a settling time $T_s$ before being substantially at a constant level (100% power level). The settling time $T_s$ should be within the time range from 0 to 1500 µs. During power-up, the envelope should rise monotonically when exceeding the 10% power level until at least the ripple limit $M_l$ (95% power level). During power-down, the envelope should decrease monotonically when falling below between 90% power level until at least the power of limit $M_s$ (1% power level). The power levels $M_l$ (undershoot, max. 95%) and $M_h$ (overshoot, max. 105%) define the power level boundaries of the RF envelope.

It should be noted that in some regions a carrier sensing attempt has to be performed before beginning radio frequency identification (RFID) communication. For instance with respect to ETSI (European Telecommunications Standards Institute) regulations, which especially have to be considered in Europe, the use of radio frequency identification (RFID) communication for instance at a frequency range from 865 MHz to 868 MHz presupposes a so-called "Listen-Before-Talk" (LBT) operation. The Listen-Before-Talk (LBT) operation is provided to detect whether a distinct frequency sub-band intended for radio frequency identification (RFID) communication is currently occupied or free (unoccupied). The detection should avoid collisions of the communications at the same radio frequency sub-band. For instance according to ETSI specifications, immediately prior to each communication by a radio frequency identification (RFID) reader subsystem, the radio frequency identification (RFID) reader subsystem has to be switched into a so-called listen mode in which one or more pre-selected frequency sub-bands are monitored for a specific listening period of time, which will be also designed as carrier sensing period $T_{LSB}$. The carrier sensing period $T_{LSB}$ (for instance in accordance with the ETSI regulations) should comprise a fixed time interval e.g. 5 ms and a random time interval e.g. in the time range from 0 ms to r ms, in particular in the time range from 0 ms to 5 ms. In case the monitored sub-band is free (unoccupied), the random time interval is set to 0 ms. The ETSI specifications further define certain permitted minimum levels for threshold levels, which define sensitivity characteristics. These permitted minimum levels are dependent on the transmission power level intended to be used for radio frequency identification (RFID) communication. Note that the variable carrier sensing period $T_{LSB}$ (equal to a variable period of time in the time range from 5 ms to 10 ms) should be also considered when adjusting and/or optimizing of the operation of the radio frequency identification (RFID) reader subsystem.

With reference to FIG. 6c, the data encoding on physical layer is depicted. In particular, the RF envelope signal of coding symbols data-0 and data-1 used for data encoding is depicted. $T_{ari}$ is the reference time interval for interrogator-to-tag signaling (i.e. radio frequency identification (RFID) reader subsystem to transponder signaling) and represents a duration of the data-0 symbol representing for instance binary 0. The value x (within the value range from 0.5 to 1.0) defines the data-1 duration on the basis of the reference time interval $T_{ari}$, i.e. value x defines a relative reference time interval for interrogator-to-tag signaling and represents a duration of the data-1 symbol on the basis of the duration of the data-0 symbol, where the data-1 symbol represents for instance binary 0. High values represent transmitted continuous wave (CW), which is designated above interrogation or excitation RF signal, as well. Low values represent attenuated CW. The modulation depth, rise time, fall time and pulse width are defined. Valid values of the aforementioned parameters depend on the type of modulation employed for communication to the transponder including Double Side-Band Amplitude-Shift Keying (DBS-ASK), Single Side-Band Amplitude-Shift Keying (SSB-ASK), and Phase-Reversal Amplitude-Shift Keying (PR-ASK), which have to be supported by the transponders. According to the type of modulation the reference time interval $T_{ari}$ can have the values 6.25 µs (for DSB-ASK), 12.5 µs (for SSB-ASK), and 25 µs (for PR-ASK). Moreover, modulation depth should be minimal 80%, typically 90%, and maximal 100%. The RF envelope rise time (10%→90%) and the RF envelope rise time (90%→10%) should be within the range of 0 to $0.33*T_{ari}$. The RF pulse width should be within the range of MAX $(0.265*T_{ari}, 2)$ to $0.525*T_{ari}$.

The RF pulse width, RF envelope rise time, the RF envelope fall time are specific for radio frequency identification (RFID) reader subsystem. These parameters can only be read and are not modifiable. The carrier frequency may be selected from the frequency range from 860 MHz to 960 MHz. However, local regulations have to be considered and the carrier frequency should be determined additionally by local radio frequency environment.

With reference to FIG. 6d, an exemplary Reader to Transponder (R→T) and Transponder to Reader (T→R) link timing is illustrated. The Reader to Transponder (R→T) communication is based on the continuous wave (CW), which corresponds to the aforementioned RF interrogation/excitation signal. The continuous wave is continuously emitted by the radio frequency identification (RFID) reader subsystem to ensure energizing of the radio frequency identification (RFID) transponder. For accessing the information stored by the radio frequency identification (RFID) transponder, the set of commands are provided, which can be modulated onto the continuous wave.

In more detail, the radio frequency identification (RFID) reader subsystem is enabled sending information to one or more radio frequency identification (RFID) transponders by modulating a RF carrier (continuous wave (CW); interrogation or excitation RF signal) using double-sideband amplitude shift keying (DSB-ASK), single-sideband amplitude shift keying (SSB-ASK) or phase-reversal amplitude shift keying (PR-ASK) using a pulse-interval encoding (PIE) format. The radio frequency identification (RFID) transponders are arranged to receive their operating energy from this same modulated RF carrier.

A radio frequency identification (RFID) reader subsystem is further arranged to receive information from a radio frequency identification (RFID) transponder by transmitting an unmodulated RF carrier (continuous wave (CW); interrogation or excitation RF signal) and listening for a backscattered reply. Radio frequency identification (RFID) transponders communicate information by backscatter-modulating the amplitude and/or phase of the RF carrier. The encoding format, selected in response to radio frequency identification (RFID) reader subsystem commands, is for example either FM0 or Miller-modulated subcarrier. The communications link between a radio frequency identification (RFID) reader subsystem and radio frequency identification (RFID) transponder is half-duplex, meaning that radio frequency identification (RFID) transponder should not be required to demodulate radio frequency identification (RFID) reader subsystem commands while backscattering. A radio frequency identification (RFID) transponder should not respond using full-duplex communications.

Exemplarily, a select, query and acknowledgement command is depicted. Before issuing a command to the radio frequency identification (RFID) transponder, the radio frequency identification (RFID) reader should at least emit the continuous wave for eight times of the Interrogator-to-Tag calibration symbol $RT_{cal}$ period, where $RT_{cal}$ is equal to the length of the data-0 and data-1 symbol (i.e. $RT_{cal}$ is within the time range form 2.5*Tari to 3.0*Tari).

Upon receiving a select command by a radio frequency identification (RFID) transponder, the transponder is instructed to reply on further command. The first query command instructs the selected radio frequency identification (RFID) transponder to respond a 16-bit random or pseudo-random number (RN16). Upon reception of an acknowledgement command from the radio frequency identification (RFID) reader informing the radio frequency identification (RFID) transponder that the 16-bit random or pseudo-random number (RN16) is valid, the transponder for instance transmits an electronic product code (EPC), protocol control (PC) and a cyclic redundancy check (CRC) value. The radio frequency identification (RFID) reader is able to verify on the basis of the cyclic redundancy check whether the response is received successfully or not. Accordingly, the radio frequency identification (RFID) reader may transmit then a further command or a non-acknowledgement command. The latter command is transmitted to indicate to the radio frequency identification (RFID) transponder that the payload of the previous response has been received erroneously.

As indicated in FIG. 6d, several waiting periods have to be considered for instance waiting periods between transmissions of consecutive radio frequency identification (RFID) reader commands ($T_4$), between end of a radio frequency identification (RFID) reader command and start of the radio frequency identification (RFID) transponder response ($T_1$), and, vice versa, between end of the radio frequency identification (RFID) transponder response and start of a following radio frequency identification (RFID) reader command ($T_2$).

Commands and sequences of commands are provided to retrieve information from radio frequency identification (RFID) transponders and/or to modify the information stored at the radio frequency identification (RFID) transponders.

With reference to FIG. 6e, a principle radio frequency identification (RFID) command sequence and radio frequency identification (RFID) transponder states are illustratively represented. The radio frequency identification (RFID) communication according to the EPCglobal standard is arranged for communication with a population of transponders, which includes in particular the communication with a single transponder.

The radio frequency identification (RFID) reader subsystem is enabled to manage a population of radio frequency identification (RFID) transponders on the basis of three basic processes, which comprises in turn one or more process specific commands. The following description briefly described the basic processes without going into details.

A Select process is provided for choosing a population of radio frequency identification (RFID) transponders for subsequent communication, in particular inventory and access command communication. A Select command may be applied successively to select a particular population of radio frequency identification (RFID) transponders based on user-specified criteria. This operation can be seen as analog to selecting one or more records from a database.

An Inventory process is provided fro identifying radio frequency identification (RFID) transponders, i.e. for identifying radio frequency identification (RFID) transponders out of the population chosen by the means of the Select command. A radio frequency identification (RFID) reader subsystem may begin an inventory round, i.e. one or more inventory command and transponder response cycles, by transmitting a Query command in one of four sessions. One or more radio frequency identification (RFID) transponders may reply. The radio frequency identification (RFID) reader subsystem is enabled detecting a single radio frequency identification (RFID) transponders reply and requesting the PC, EPC, and CRC from the detected radio frequency identification (RFID) transponder. Inventory process may comprise multiple inventory commands. An inventory round operates in one session at a time.

An Access process is provided for communicating with a radio frequency identification (RFID) transponder, where the communication comprises especially reading from and/or writing to the radio frequency identification (RFID) transponder. An individual radio frequency identification (RFID) transponders should be uniquely identified prior to the access process. The Access process may comprise multiple access commands, some of which employ one-time-pad based cover-coding of the Reader to Transponder communication link.

In more detail, the Selection process employs a single command, Select, which a radio frequency identification (RFID) reader subsystem may apply successively to select a particular population of radio frequency identification (RFID) transponders based on user-defined criteria, enabling union, intersection, and negation based transponder partitioning. The radio frequency identification (RFID) reader subsystems are enabled performing union and intersection operations by issuing successive Select commands.

The inventory process command set includes Query, QueryAdjust, QueryRep, ACK (acknowledgement), and NAK (non-acknowledgement) commands. The Query command initiates an inventory round and decides which radio frequency identification (RFID) transponders participate in the inventory round, where "inventory round" is defined as the period between successive Query commands. The Query command includes a slot-count parameter Q used for random back-off in the collision avoidance scheme. The slot-count parameter Q is configurable and settable by the radio frequency identification (RFID) reader subsystem. Upon receiving a Query command, each of the participating radio frequency identification (RFID) transponders should pick a random value in the range from 0 to $2^Q-1$ and should store this value into its slot counter. The radio frequency identification (RFID) transponders that pick a zero should transition to the reply state and reply immediately. The radio frequency identification (RFID) transponders that pick a nonzero value should transition to the arbitrate state and await a QueryAdjust or a QueryRep command. Assuming that a single radio frequency identification (RFID) transponder replies, the query-response algorithm provides the radio frequency identification (RFID) transponder for backscattering a 16-bit random number or pseudo-random number (RN16) response as it enters reply. The radio frequency identification (RFID) reader subsystem acknowledges the radio frequency identification (RFID) transponder with an acknowledgment (ACK) command including this same RN16. Then, the acknowledged radio frequency identification (RFID) transponder transitions to the acknowledged state, backscattering its PC, EPC, and CRC. Further, the radio frequency identification (RFID) reader subsystem may issue a QueryAdjust or QueryRep command, causing the identified radio frequency identification (RFID) transponder to transition to ready state, and potentially causing another radio frequency identification (RFID) transponder to initiate a query-response dialog with the radio frequency identification (RFID) reader subsystem, starting again the aforementioned query process sequence. If a radio frequency identification (RFID) transponder fails to receive the ACK command or receives the ACK command with an erroneous RN16, the radio frequency identification (RFID) transponder should return to arbitrate state.

The radio frequency identification (RFID) transponders in arbitrate states or reply states that receive a QueryAdjust first adjust Q (by incrementing, decrementing, or leaving it unchanged), then pick a random value in the range from 0 to $2^Q-1$ and stores this value into their slot counter. The radio frequency identification (RFID) transponders that pick zero should transition to the reply state and reply immediately. The radio frequency identification (RFID) transponders that pick a nonzero value should transition to the arbitrate state and await a QueryAdjust or a QueryRep command. The radio frequency identification (RFID) transponders in the arbitrate state decrement their slot counter every time they receive a QueryRep, transitioning to the reply state and backscattering a RN16 when their slot counter reaches zero.

In summary, during RF activity cycle of the radio frequency identification (RFID) reader subsystem, first radio frequency identification (RFID) transponders are selects in accordance with the Select process, afterwards the radio frequency identification (RFID) reader subsystem may proceed to Inventory process and last an Access process by be executed.

Those skilled in the art will appreciate that the scheduler is preferably enabled to obtain one or more of the aforementioned parameter values and, if desired or required, to modify one or more of the parameter values. The scheduler obtains and/or modifies the parameter values through the configuration and adjustment interface described above.

The scheduler may at least obtain and modify parameter values that are relevant to aligning the RF activity of the radio frequency identification (RFID) reader subsystem and the cellular communication subsystem. The activity of the cellular communication subsystem is prioritized over the activity of the radio frequency identification (RFID) reader subsystem due to the fact that the activity of the cellular communication subsystem is typically under control of the Radio Access Network (RAN) and the possibilities of the terminal to affect the activity of the cellular communication subsystem is very limited.

Correspondingly, the available time periods and their timely distance allowing radio frequency identification (RFID) communication are known from the periods of activity and non-activity of the cellular communication subsystem. This means that maximum durations of individual continuous waves (CWs), refer to FIG. 6d, and a sleep duration between two consecutive continuous waves (CWs) is known. Within such maximum durations, the radio frequency identification (RFID) communication between reader subsystem and transponder(s) has to be performed, refer to FIGS. 6d and 6e. The duration in time required for an envisaged radio frequency identification (RFID) communication procedure comprising one or more commands and responses can be determined or estimated from commands and response sequence as well as the timing requirements illustrated above. By adjusting one or more timing parameters including in particular, reference time interval $T_{ari}$, relative reference time interval value x, RF pulse width, carrier frequency, and slot-count parameter Q, the duration in time required for the envisaged radio frequency identification (RFID) communication procedure can be optimized in order to fit into a maximum duration of a single continuous wave (CW). The adjustment of the parameters should be at least possible within one or more tolerance ranges. Upon setting of the digital (I/O) trigger signal, which substantially represent a Boolean parameter, the Select process is started.

In addition, the RF power level of the radio frequency identification (RFID) reader subsystem may be adjusted on a corresponding power setting command issued by the scheduler to the radio frequency identification (RFID) reader subsystem. Moreover, the number of radio frequency identification (RFID) transponders to be read out may be defined or limited.

It should be noted that the periods of non-activity of the cellular communication subsystem may be short in time in relationship to the duration in time required for a radio frequency identification (RFID) communication in the way described above on the basis of the EPCglobal standard for the way of illustration. The Reader-to-Transponder bit rate is within a range from 26.7 kbps to 128 kbps depending on the modulation scheme applied, whereas the Transponder-to-Reader bit rate within a range from 40 kbps to 640 kbps (and 5 kbps to 320 kbps when subcarrier modulate). However, the effective bit rate suffers from the several timing requirements for instance illustrated above with reference to FIG. 6d. The period of non-activity available for radio frequency identification (RFID) communication should be used as effectively as possible.

The radio frequency identification (RFID) communication and operation is primarily described above in view of product tagging and identification application. It should be understood that the invention is not limited to any specific application and use case in the field of radio frequency identification (RFID) technology. In general, radio frequency identification (RFID) technology can be considered as a wireless storage technology, where transponders provide read-only and/or random access storage, which storage is wirelessly accessible by the means of reader subsystems. In principle, the communication between transponders and reader subsystem is operable in analogy to the illustrative embodiments. For instance, radio frequency identification (RFID) technology has been selected for storing biometric identification information in digitally enhanced passports. Such a passport comprises a radio frequency identification (RFID) transponder, which stores biometric information about the holder of the passport such as a digital image of his face, a digital representation of one or more finger prints, and/or a digital representation of an iris scan. Radio frequency identification (RFID) reader subsystems provided at passport control stations at a border of a state enable access to the stored biometric information to authenticate the holder of the passport. In particular, the radio frequency identification (RFID) transponders in the passports implement access control mechanism to prevent unauthorized access to the stored information.

Moreover, radio frequency identification (RFID) transponder may be also provided with sensor logic, especially condition monitoring sensors or environmental monitoring sensors such as temperature sensors, humidity sensors, pressure sensors, gas sensors (detecting one or more specific types of gas) and the like. The calibrating of such sensors and/or the reading access to these ones can be operated through the interface(s) described above in detail. However, it should to be considered that the calibration access to a sensor implemented in a radio frequency identification (RFID) transponder requires a period in time, which will be designated as a sensor reading period $T_{read}$. The same applies to the reading access of the data generated by such a sensor. The access to the data generated by a sensor or obtained from a sensor requires a period in time, which will be designated as a sensor writing period $T_{write}$. Note that one or more sensor writing periods $T_{write}$ and one or more sensor reading periods $T_{read}$ should be also considered when adjusting and/or optimizing of the operation of the radio frequency identification (RFID) reader subsystem. An optimization may be obtained by limiting the number of sensor read and/or sensor write accesses, preferably to only one or more specific sensor per communication with the radio frequency identification (RFID) transponder during a period of non-activity. In contrast to the above mentioned parameters which relate to communication properties (communication related parameters) the sensor related parameters can be designated in general as application related parameters.

According to yet a further embodiment of the present invention, the operation of the radio frequency identification (RFID) reader subsystem may be employed to emitting a RF interrogation signal (RF excitation signal, continuous wave) and, if necessary and/or required, for Listen-Before-Talk measurement(s). The RF interrogation signal is for instance (continuously) emitted to energize one or more radio frequency identification (RFID) transponders in the coverage area of the emitting radio frequency identification (RFID) reader subsystem. The data communication with the one or more radio frequency identification (RFID) transponders (including data reception from the radio frequency identification (RFID) transponders as well as data and/or command transmission to the radio frequency identification (RFID) transponders) may be operated at a different radio frequency band, eventually also with a different protocol and/or on the basis of a different wireless data communication technology. However, the energy supply through a RF interrogation signal is advantageous to enable provision of passive powered module capable for wireless data communication.

Those skilled in the art will appreciate that the concept of the present invention described on the basis of a cellular communication subsystem is also applicable with other radio frequency communication subsystems, in particular wireless network interface subsystems. This means that activity scheduling of a radio frequency identification (RFID) reader subsystem according to an embodiment of the present invention should not be limited to the aforementioned cellular communication subsystems, but the overall solution is also applicable with the envisaged 3.9 Generation and $4^{th}$ Generation Mobile Telephony Standards, WLAN (Wireless Local Area Network), WiMAX, UWB (Ultra-Wide Band), Bluetooth and any other wireless technologies. Though, the interference would be worst to wireless communication subsystem operating close to 900 MHz UHF band of the UHF radio frequency identification (RFID) subsystem, the wideband noise originating from the radio frequency identification (RFID) reader subsystem might cause also difficulties to wireless communication subsystem operating at other frequencies of spectrum.

Moreover, the scheduling according to an embodiment of the present invention would be very beneficial with 2.4 GHz ISM radio frequency identification (RFID) reader subsystems, which would cause powerful interference to wireless communication subsystems operating at 2.4 GHz ISM frequency band, e.g. IEEE 802.11b/g WLAN and Bluetooth.

On the basis of the inventive concept illustrated in accordance with the description above those skilled in the art will understand that a substantially concurrent operation of a radio frequency identification (RFID) reader subsystem and a cellular/wireless communication subsystem is operable. Advantages of the substantially concurrent operation of both subsystems can be taken by the user when additional data communication is desired by the user for instance for retrieving additional information in dependence of information retrieved from a radio frequency identification (RFID) transponder such as a data retrieval in a data base storing such additional information. In view of EPCglobal conform radio frequency identification (RFID) transponder which provides conventionally a preferably worldwide unique electronic product code (EPC), which serves as an identification code of the tagged product, the additional information may comprise for instance supply chain related information such as origin, manufacturer, wholesaler, manufacturing date, use-by date etc. Another use case may comprise the transmission of the information read out from the radio frequency identification (RFID) transponder in a data base for supply chain management purposes.

In contrast to the conventional way to first retrieve information form the radio frequency identification (RFID) transponder, buffer the retrieved information, and after that perform the data base retrieval via the cellular/wireless communication interface enabling wide area network (WAN) accesses to for instance an Internet-based database service, the inventive concept allows to omit buffering and accelerates the database retrieval due to substantially concurrent operation of both subsystems. Especially in the use case, where a multiplicity of radio frequency identification (RFID) transponders are read out and the read out information may be stored in a data base or information may be retrieved form a data base in accordance with the read-out information, the advantages of the inventive concept are immediately apparent.

Moreover, the inventive concept addresses the operation of the radio frequency identification (RFID) reader subsystem. Because of the time-aligned operation of the subsystems, where the cellular/wireless communication subsystem is typically prioritized due to network side implementations and requirements, the radio frequency identification (RFID) communication has to be adjusted to fit into the available periods of non-activity of the cellular/wireless communication subsystem. This fitting requirement can be achieved by adjusting one or more parameters obtainable from the radio frequency identification (RFID) reader subsystem and adjustable for enabling matching in time of the radio frequency identification (RFID) communication with the available one or more periods of non-activity.

It will be obvious for those skilled in the art that as the technology advances, the inventive concept can be implemented in a broad number of ways. The invention and its embodiments are thus not limited to the examples described above but may vary within the scope of the claims.

The invention claimed is:

1. Method comprising:
    determining one or more periods of activity of a wireless communication subsystem;
    deriving one or more periods of non-activity on the basis of the one or more determined periods of activity;
    synchronizing an operation of a radio frequency identification communication subsystem with the one or more periods of non-activity; and
    triggering the operation of the radio frequency identification communication subsystem in accordance with the one or more derived periods of non-activity to enable substantially concurrent communications operation of the wireless communication subsystem and the radio frequency identification communication subsystem.

2. Method according to claim 1, comprising:
    obtaining an operational state of the wireless communication subsystem, wherein the operational state comprises at least an idle operation state and an active operation state; and
    determining one or more periods of activity of the wireless communication subsystem in dependence of the operational state.

3. Method according to claim 2, wherein the wireless communication subsystem is operative in the idle operation state; said method comprising:
    obtaining timing information relating to paging operations and timing information relating to signal measurements from the wireless communication subsystem; and
    determining periods of activity including period lengths on the basis of the obtained timing information.

4. Method according to claim 2, wherein the wireless communication subsystem is operative in the active operation state; said method comprising:
    in case of a time division multiple access-based wireless communication subsystem:
        obtaining timing information about slot timing in accordance with time slots currently allocated to uplink and/or downlink communications and measurement operations;
    and in case of a code division multiple access-based wireless communication subsystem:
        obtaining timing information about periods of activity in accordance with a non-continuous communication mode.

5. Method according to claim 4, wherein said wireless communication subsystem is the time division multiple access-based wireless communication subsystem; said method comprising:
    if applicable and/or required: requesting a time slot allocation for uplink and/or downlink communication which comprises one or more unallocated time slots within a frame structure.

6. Method according to claim 4, wherein said wireless communication subsystem is a wideband code division multiple access-based wireless communication subsystem; said method comprising:
    if applicable and/or required: requesting compressed frame communication mode; and
    obtaining timing information about transmission gaps and their lengths in accordance with the compressed frame communication mode.

7. Method according to claim 4, wherein said wireless communication subsystem is a code division multiple access 2000 (cdma2000)-based wireless communication subsystem; said method comprising:
    if applicable and/or required: requesting discontinuous transmission mode; and
    obtaining timing information about the discontinuous transmission in reverse link and forward link.

8. Method according to claim 1, said method comprising:
    triggering the operation of the radio frequency identification communication subsystem in accordance with a ramp-up duration ($\Delta_I$) and/or ramp-down duration ($\Delta_{III}$) of the radio frequency identification communication subsystem.

9. Method according to claim 1, said method comprising:
    obtaining one or more communication and/or application related parameters of the radio frequency identification communication subsystem; and
    determining a communication period required for an operation of the radio frequency identification communication subsystem in accordance with the obtained communication related parameters and/or application related parameters; and
    adjusting one or more communication related parameters and/or application related parameters of the radio frequency identification communication subsystem to adapt the communication period required for the operation of the radio frequency identification communication subsystem to the one or more derived periods of non-activity.

10. Method according to claim 9, wherein the communication related parameters of the radio frequency identification communication subsystem comprises one or more of the following parameters including:

a carrier sensing period ($T_{LSB}$);
a modulation type including double sideband amplitude shift keying, single sideband amplitude shift keying, and phase reversal amplitude shift keying;
a reference time interval ($T_{ari}$;) of a data-0 symbol;
a relative reference time interval (x) of a data-1 symbol;
a RF pulse width (PW);
a carrier frequency;
a slot-count parameter (Q);
a RF envelope rise time ($T_r$);
a RF envelope fall time ($T_f$);
a settling time ($T_s$);
a time ($T_1$) from radio frequency identification command transmission to radio frequency identification transponder response;
a time ($T_2$) from radio frequency identification transponder response to radio frequency identification command transmission;
a time ($T_3$) representing a wait time upon missing radio frequency identification transponder response; and
a minimum time ($T_4$) between successive radio frequency identification (RFID) command transmissions.

11. Method according to claim 9, wherein the application related parameters of the radio frequency identification communication subsystem comprises one or more of the following parameters including:
a maximum number of sensor accesses;
a sensor reading time ($T_{read}$); and
a sensor writing time ($T_{write}$).

12. Method according to claim 1, said method comprising:
determining a frequency band currently used by the wireless communication subsystem; and
in case the frequency band of the wireless communication subsystem is such close to a frequency band used by the radio frequency identification communication subsystem that interference have to be expected:
requesting for a frequency band handover of the wireless communication subsystem to a frequency band where interference have not to be expected; and
enabling concurrent communications operation of the wireless communication subsystem and the radio frequency identification communication subsystem.

13. Method according to claim 12, wherein the frequency band handover enables an operation of the wireless communication subsystem at another frequency band using a same protocol.

14. Method according to claim 12, wherein the frequency band handover comprises a protocol handover.

15. Method according to claim 1, said method comprising:
lowering a radio frequency (RF) signal power level of the radio frequency identification communication subsystem; and
determining an interference level;
in case the interference level is below a threshold: enabling concurrent communications operation of the wireless communication subsystem and the radio frequency identification communication subsystem.

16. Method according to claim 1, wherein the radio frequency identification communication subsystem is operable at an ultra high frequency band, in particular at a frequency range from 860 MHz to 960 MHz.

17. Method according to claim 1, wherein the wireless communication subsystem is operable with at least one out of a group including a time division multiple access-based cellular wireless communication subsystem and a code division multiple access-based cellular communication subsystem.

18. Method according to claim 16, wherein the wireless communication subsystem is operable with at least one out of a group including a global system for mobile communication, GSM, cellular communication subsystem, a global system for mobile communication, GSM/general packet radio service, GPRS, cellular communication subsystem, a global system for mobile communication, GSM/enhanced data rates for global system for mobile communication evolution, EDGE, cellular communication subsystem, a wideband code division multiple access-based cellular communication subsystem, and a code division multiple access 2000, cdma2000, cellular communication subsystem.

19. Computer program product comprising program code sections stored on a machine-readable medium for carrying out the operations of claim 1, when said program product is run on a processor-based device, a terminal device, a network device, a portable terminal, a consumer electronic device, or a wireless communication enabled terminal.

20. An apparatus comprising a processing unit and a memory including software instructions, the memory and the software instructions configured to, with the processing unit, direct the apparatus at least to:
determine one or more periods of activity of a wireless communication subsystem and derive one or more periods of non-activity on the basis of the one or more determined periods of activity;
synchronize with the one or more periods of non-activity; and
cause a trigger signal to be generated to trigger an operation of a radio frequency identification communication subsystem in accordance with the one or more derived periods of non-activity to enable substantially concurrent communications operation of the wireless communication subsystem and the radio frequency identification communication subsystem.

21. Apparatus according to claim 20, wherein the memory and the software instructions are further configured to, with the processing unit, direct the apparatus at least to: obtain an operational state of the wireless communication subsystem, which is operable with at least an idle operation state and an active operation state, and
determine one or more periods of activity of the wireless communication subsystem in dependence of the operational state.

22. Apparatus according to claim 21, wherein the wireless communication subsystem is operative in the idle operation state,
wherein the memory and the software instructions are further configured to, with the processing unit, direct the apparatus at least to: obtain timing information relating to paging operations and timing information relating to signal measurements from the wireless communication subsystem, and
determine periods of activity including period lengths on the basis of the obtained timing information.

23. Apparatus according to claim 21, wherein the wireless communication subsystem is operative in the active operation state, and wherein the memory and the software instructions are further configured to, with the processing unit, direct the apparatus at least to:
in case of a time division multiple access-based wireless communication subsystem, obtain timing information about slot timing in accordance with time slots currently allocated to uplink and/or downlink communications and measurement operations,
in case of a code division multiple access-based wireless communication subsystem, obtain timing information about periods of activity in accordance with a non-continuous communication mode.

24. Apparatus according to claim 20, wherein the trigger signal is generated in accordance with a ramp-up duration ($\Delta_I$) and/or ramp-down duration ($\Delta_{III}$) of the radio frequency identification communication subsystem.

25. Apparatus according to claim 20, wherein the memory and the software instructions are further configured to, with the processing unit, direct the apparatus at least to: obtain one or more communication related parameters and/or application related parameters of the radio frequency identification communication subsystem, determine a communication period required for an operation of the radio frequency identification communication subsystem in accordance with the obtained communication related parameters and/or application related parameters; and adjust one or more communication related parameters and/or application relates parameters of the radio frequency identification communication subsystem to adapt the communication period required for the operation of the radio frequency identification communication subsystem to the one or more derived periods of non-activity.

26. Apparatus according to claim 25, wherein the communication related parameters of the radio frequency identification communication subsystem comprises one or more of the following parameters including:
a carrier sensing period ($T_{LSB}$);
a modulation type including double sideband amplitude shift keying, single sideband amplitude shift keying, and phase reversal amplitude shift keying;
a reference time interval ($T_{ari}$) of a data-0 symbol;
a relative reference time interval (x) of a data-1 symbol;
a RF pulse width (PW);
a carrier frequency;
a slot-count parameter (Q);
a RF envelope rise time ($T_r$);
a RF envelope fall time ($T_f$);
a settling time ($T_s$);
a time ($T_1$) from radio frequency identification command transmission to radio frequency identification transponder response;
a time ($T_2$) from radio frequency identification transponder response to radio frequency identification command transmission;
a time ($T_3$) representing a wait time upon missing radio frequency identification transponder response; and
a minimum time ($T_4$) between successive radio frequency identification command transmissions.

27. Apparatus according to claim 25, wherein the application related parameters of the radio frequency identification communication subsystem comprises one or more of the following parameters including:
a maximum number of sensor accesses;
a sensor reading time ($T_{read}$); and
a sensor writing time ($T_{write}$).

28. Apparatus according to claim 20, wherein the memory and the software instructions are further configured to, with the processing unit, direct the apparatus at least to determine a frequency band currently used by the wireless communication subsystem, wherein in case the frequency band of the wireless communication subsystem is such close to a frequency band used by the radio frequency identification communication subsystem that interference have to be expected, the memory and the software instructions are further configured to, with the processing unit, direct the apparatus at least to request for a frequency band handover of the wireless communication subsystem to a frequency band where interference have not to be expected, wherein the frequency band handover enables concurrent communications operation of the wireless communication subsystem and the radio frequency identification communication subsystem.

29. Apparatus according to claim 20, wherein the memory and the software instructions are further configured to, with the processing unit, direct the apparatus at least to lower a RF signal power level of the radio frequency identification communication subsystem and determine an interference level such that in case the interference level is below a threshold: concurrent communications operation of the wireless communication subsystem and the radio frequency identification communication subsystem is enabled.

30. Terminal device comprising a scheduling module operable with a wireless communication subsystem and a radio frequency identification communication subsystem;
wherein the scheduling module is configured to determine one or more periods of activity of the wireless communication subsystem and derive one or more periods of non-activity on the basis of the one or more determined periods of activity;
wherein the scheduling module is synchronized with the one or more periods of non-activity; and
wherein the scheduling module is configured to cause a trigger signal to be generated to trigger an operation of the radio frequency identification communication subsystem in accordance with the one or more derived periods of non-activity to enable substantially concurrent communications operation of the wireless communication subsystem and the radio frequency identification communication subsystem.

31. Device according to claim 30, wherein the scheduling module is configured to obtain an operational state of the wireless communication subsystem, which is operable with at least an idle operation state and an active operation state, wherein the scheduling module is configured to determine one or more periods of activity of the wireless communication subsystem in dependence of the operational state.

32. Device according to claim 30, wherein the wireless communication subsystem and the radio frequency identification communication subsystem are operable with a common antenna, which radio frequency characteristic is configured to operating frequencies of the subsystems.

33. Device according to claim 30, wherein the trigger signal is generated upon signalization from an application executable at the device and/or upon reception of an input signal originating from a user input.

34. Device according to claim 30, wherein the terminal device is a cellular terminal device configured for multi frequency band and/or multi system cellular communications.

35. Device according to claim 34, wherein the wireless communication subsystem is operable with at least one out of a group including a time division multiple access-based cellular wireless communication subsystem and a code division multiple access-based cellular communication subsystem.

36. Device according to claim 35, wherein the wireless communication subsystem is operable with at least one out of a group including a global system for mobile communication, GSM, cellular communication subsystem, a global system for mobile communication, GSM/general packet radio service, GPRS, cellular communication subsystem, a global system for mobile communication, GSM/enhanced data rates for global system for mobile communication evolution, EDGE, cellular communication subsystem, a wideband code division multiple access-based cellular communication subsystem, an universal mobile telecommunications system, UMTS, cellular communication subsystem, and a code division multiple access 2000, cdma2000, cellular communication subsystem.

37. Device according to claim 30, wherein the wireless communication subsystem is a wireless network interface subsystem, wherein the wireless network interface subsystem is operable with at least one out of a group including IEEE 802.xx wireless network communication technology, Bluetooth wireless communication technology, and ultra-wide band wireless network communication technology.

38. System comprising a scheduling module operable with a wireless communication subsystem and a radio frequency identification communication subsystem;
   wherein the scheduling module is configured to determine one or more periods of activity of the wireless communication subsystem and derive one or more periods of non-activity on the basis of the one or more determined periods of activity;
   wherein the scheduling module is synchronized with the one or more periods of non-activity; and
   wherein the scheduling module is configured to cause a trigger signal to be generated to trigger an operation of the radio frequency identification communication subsystem in accordance with the one or more derived periods of non-activity to enable substantially concurrent communications operation of the wireless communication subsystem and the radio frequency identification communication subsystem.

39. System according to claim 38, wherein the scheduling module is configured to obtain an operational state of the wireless communication subsystem, which is operable with at least an idle operation state and an active operation state, wherein the scheduling module is configured to determine one or more periods of activity of the wireless communication subsystem in dependence of the operational state.

40. System according to claim 38, further comprising a terminal device that comprises the scheduling module.

41. System according to claim 38, wherein the wireless communication subsystem and the radio frequency identification communication subsystem are operable with a common antenna, which radio frequency characteristic is configured to operating frequencies of the subsystems.

42. System according to claim 38, wherein the radio frequency identification communication subsystem is at least operable at an ultra high frequency band, in particular at a frequency range from 860 MHz to 960 MHz.

43. System according to claim 42, wherein the radio frequency identification communication subsystem is operable with EPC Global standard.

44. System according to claim 38, wherein the radio frequency identification communication subsystem is operable at an ISM frequency band, in particular at a 2.4 GHz ISM frequency band.

45. A computer program product comprising a non-transitory machine-readable medium having program code stored thereon, the program code configured to direct an apparatus to:
   determine one or more periods of activity of a wireless communication subsystem; derive one or more periods of non-activity on the basis of the one or more determined periods of activity;
   synchronize an operation of a radio frequency identification communication subsystem with the one or more periods of non-activity; and
   trigger the operation of the radio frequency identification communication subsystem in accordance with the one or more derived periods of non-activity to enable substantially concurrent communications operation of the wireless communication subsystem and the radio frequency identification communication subsystem.

* * * * *

UNITED STATES PATENT AND TRADEMARK OFFICE
CERTIFICATE OF CORRECTION

PATENT NO.        : 8,519,847 B2
APPLICATION NO.   : 12/094867
DATED             : August 27, 2013
INVENTOR(S)       : Honkanen et al.

It is certified that error appears in the above-identified patent and that said Letters Patent is hereby corrected as shown below:

In the Claims:

Column 37,
Line 23, "identification (RFID) command transmissions." should read
--identification command transmissions.--.

Signed and Sealed this
Seventeenth Day of December, 2013

Margaret A. Focarino
*Commissioner for Patents of the United States Patent and Trademark Office*